US007539636B2

(12) United States Patent
Madhavan et al.

(10) Patent No.: US 7,539,636 B2
(45) Date of Patent: May 26, 2009

(54) SYSTEM AND METHOD FOR ESTIMATING TRANSACTION COSTS RELATED TO TRADING A SECURITY

(75) Inventors: Ananth Madhavan, New York, NY (US); Artem V. Asriev, Winchester, MA (US); Milan P Borkovec, Boston, MA (US)

(73) Assignee: ITG Software Solutions, Inc., Culver City, CA (US)

( * ) Notice: Subject to any disclaimer, the term of this patent is extended or adjusted under 35 U.S.C. 154(b) by 0 days.

(21) Appl. No.: 10/674,432

(22) Filed: Oct. 1, 2003

(65) Prior Publication Data

US 2004/0215549 A1    Oct. 28, 2004

Related U.S. Application Data

(60) Provisional application No. 60/464,962, filed on Apr. 24, 2003.

(51) Int. Cl.
*G06Q 40/00* (2006.01)
(52) U.S. Cl. ...................... 705/35; 705/36 R
(58) Field of Classification Search .............. 705/35, 705/36–40
See application file for complete search history.

(56) References Cited

U.S. PATENT DOCUMENTS

| 6,754,612 B1 * | 6/2004 | Vanfladern et al. ........... 702/186 |
| 7,016,872 B1 * | 3/2006 | Bettis et al. ................ 705/36 R |
| 2003/0225660 A1 * | 12/2003 | Noser et al. .................... 705/36 |

OTHER PUBLICATIONS

B. Efron, "Regression Percentiles Using Asymmetric Squared Error Loss" Departmnet of Statistics, Stanford University, Stanford, CA 94305, USA, 1991; http://www3.stat.sinica.edu.tw/statistica/oldpdf/A1n16.pdf.*
Keim et al ,"The Cost of Institutional Equity Trades", Jul./Aug. 1998, Financial Analyst Journal, Charlottesville, vol. 54, Iss 4; p. 50.*
Exhibits 1 and 2 from Keim et al.*
Tables 1 and 2; Figures 1-3 f from Keim et al.*
Berkowitz, S., Logue, D. and Noser E. (1988) *The Total Cost of Transactions on the NYSE*, Journal of Finance, vol. 43, Issue 1, 97-112.
Breen, W.J., Hodrick, L.S. and Korajczyk, R.A. (2002) *Predicting Equity Liquidity*, Management Science, INFORMS, 48, 470-483.
Chakravarty, S., Panchapagesan, V. and Wood R.A. (2002) *Has Decimalization Hurt Institutional Inventors? An Investigation into Trading Costs and Order Routing Practices of Buy-Side Institutions*, http://www.nber.org/-confer/2002/micro02/wood.pdf.

(Continued)

*Primary Examiner*—Hani Kazimi
*Assistant Examiner*—Olabode Akintola
(74) *Attorney, Agent, or Firm*—Rothwell, Figg, Ernst & Manbeck, PC

(57) ABSTRACT

A method for creating a peer group database includes a step of collecting security transaction data for a preselected period of time, for a plurality of investment institutions. The transaction data includes identity of securities being traded, transaction order sizes, execution prices and execution times. The transaction data is grouped into a plurality of orders. A plurality of cost benchmarks are calculated for each of the orders. Transaction costs are estimated for each investment institution relative to the cost benchmarks. The data is stored.

54 Claims, 17 Drawing Sheets

OTHER PUBLICATIONS

Chan, L.K.C. and Lakonishok, J. (1995) *The Behavior of Stock Prices Around Institutional Trades*, Journal of Finance, 50, 1147-1174.

Domowitz, I., Glen, J. and Madhavan, A. (2001) *Global Equity Trading Costs*, http://www.itginc.com/research/whitepapers/domowitz/globaleqcost.pdf.

ITG, Inc. (2003) ACM™—Agency Cost Estimator, ITG Financial Engineering.

Keim, D.B. and Madhavan, A. (1996) *The Upstairs Market for Large-Block Transactions: Analysis and Measurement of Price Effects*, Review of Financial Studies, 9, 1-36.

Keim, D.B. and Madhavan, A. (1997) *Transaction costs and investment style: an inter-exchange analysis of institutional equity trades*, Journal of Financial Economics, 46, 265-292.

Madhavan, A. (2002) *VWAP Strategies*, Investment Guides, Spring 2002, 32-39.

Perold, A. (1988) *The implementation shortfall: Paper versus reality*, Journal of Portfolio Management, 14, 4-9.

Schwartz, R.A. and Steil, B. (2002) *Controlling Institutional Trading Costs: we have met the enemy and it is us*, Journal of Portfolio Management, 28, 39-49.

Teitelbaum, R. (2003) *Investing; Know a Fund's Cost? Look, deeper*, The New York Times Company, Feb. 9, 2003.

*Transaction Costs—A Cutting-Edge Guide to Best Execution* (2001) Investment Guides, Spring 2001, edited by Brian R. Bruce, Institutional Investor Inc.

*Transaction Performance—The Changing Face of Trading* (2002) Investment Guides, Spring 2002, edited by Brian R. Bruce, Institutional Investor Inc.

Werner, I.M. (2000) *NYSE Execution Costs*, http://www.ruf.rice.edu/-jgsfss/Werner.pdf.

* cited by examiner

| Type | Market Cap | Side | Market | Size | Momentum |
|---|---|---|---|---|---|
| All | All (A) | All (A) | All (A) | All | All |
| Growth | Large (L) | Buy (B) | Listed (N) | ≤ 1% | ≤ −0.1 |
| Value | Mid (M) | Sell (S) | OTC (Q) | (1,5]% | (-0.1,-0.02] |
| Micro-Cap | Small (S) | | | (5,10]% | (-0.02,0.02] |
| | | | | (10,25]% | (0.02,0.1] |
| | | | | (25,50]% | > 0.1 |
| | | | | > 50% | |

Table 1: Values, ranges and codes of categories used in PGD.

Fig. 1

| Category | No. Trades (in mill.) | No. Orders (in mill.) | Dollar Value (in bill.) | No. Shares (in bill.) | No. Stocks |
|---|---|---|---|---|---|
| All | 14.6 | 6.4 | 2,105 | 82.7 | 11,288 |
| Type | | | | | |
|    Growth | 10.0 | 4.3 | 1,484 | 58.0 | 4,686 |
|    Value | 9.1 | 4.1 | 1,307 | 51.4 | 5,104 |
|    Micro cap | 0.2 | 0.1 | 9.3 | 1.2 | 5,658 |
| Market Cap | | | | | |
|    Large cap | 4.2 | 2.2 | 1,116 | 33.2 | 500 |
|    Mid cap | 5.3 | 2.3 | 698 | 28.6 | 1,842 |
|    Small cap | 5.1 | 1.9 | 289 | 20.9 | 9,998 |
| Side | | | | | |
|    Buy | 7.8 | 3.5 | 1,050 | 41.1 | 10,722 |
|    Sell | 6.8 | 2.9 | 1,054 | 41.6 | 10,004 |
| Market | | | | | |
|    Listed | 9.1 | 4.5 | 1,625 | 55.7 | 4,838 |
|    OTC | 5.5 | 2.0 | 479 | 27.0 | 6,524 |
| Size | | | | | |
|    $\leq 1\%$ | 12.7 | 5.2 | 706 | 25.4 | 8,486 |
|    $(1, 5]\%$ | 1.2 | 0.7 | 610 | 23.0 | 9,582 |
|    $(5, 10]\%$ | 0.3 | 0.2 | 286 | 11.2 | 9,402 |
|    $(10, 25]\%$ | 0.2 | 0.2 | 294 | 12.1 | 9,622 |
|    $(25, 50]\%$ | 0.07 | 0.07 | 113 | 5.2 | 8,758 |
|    $> 50\%$ | 0.05 | 0.05 | 95 | 5.8 | 8006 |
| Momentum | | | | | |
|    $\leq -0.1$ | 1.1 | 0.5 | 103 | 5.5 | 10,136 |
|    $(-0.1, -0.02]$ | 4.3 | 1.9 | 643 | 26.1 | 8,708 |
|    $(-0.02, 0.02]$ | 4.5 | 2.0 | 712 | 26.4 | 8,368 |
|    $(0.02, 0.1]$ | 3.8 | 1.7 | 565 | 20.9 | 8,656 |
|    $> 0.1$ | 0.9 | 0.4 | 81.7 | 3.7 | 9,906 |

Table 2: Number of executions, orders, shares, stocks and dollar volume for various categories of the sample.

Fig. 2

| Category | $C_{T-1}$ | $V_T$ | $C_{T-1}$ | $C_{T-20}$ | $O_T$ | $M_T$ |
|---|---|---|---|---|---|---|
| All | -39 (-22) | -7 (-4) | 2 (6) | -11 (-22) | -31 (-20) | -5 (-4) |
| Type | | | | | | |
| Growth | -42 (-24) | -7 (-4) | 1 (8) | -11.6 (-20) | -33 (-20) | -5 (-3) |
| Value | -37 (-16) | -8 (-3) | 4 (2) | 1 (-24) | -29 (-16) | -5 (-4) |
| Micro cap | -87 (-78) | -14 (-19) | 7 (2) | 5 (-68) | -68 (-78) | -20 (-31) |
| Market Cap | | | | | | |
| Large cap | -31 (-17) | -6 (-3) | -1 (1) | 1 (-11) | -25 (-14) | -4 (-1) |
| Mid cap | -44 (-13) | -8 (-3) | 2 (7) | -14 (-5) | -33 (-11) | -6 (-2) |
| Small cap | -55 (-36) | -9 (-6) | 11 (8) | -46 (-50) | -46 (-33) | -4 (-7) |
| Side | | | | | | |
| Buy | 23 (6) | -7 (-7) | -21 (-19) | -356 (-384) | 0 (-3) | -3 (-5) |
| Sell | -100 (-54) | -8 (-1) | 24 (33) | 333 (388) | -61 (-39) | -6 (-2) |
| Market | | | | | | |
| Listed | -29 (-13) | -7 (-2) | 0 (3) | -8 (-22) | -24 (-13) | -5 (-2) |
| OTC | -70 (-36) | -10 (-7) | 5 (9) | -20 (-22) | -52 (-31) | -4 (-5) |
| Size | | | | | | |
| $\leq 1\%$ | -30 (-21) | -5 (-4) | 2 (5) | -20 (-23) | -22 (-18) | -4 (-3) |
| $(1, 5]\%$ | -36 (-25) | -7 (-6) | 4 (8) | 8 (-19) | -27 (-24) | -6 (-11) |
| $(5, 10]\%$ | -41 (-30) | -8 (-8) | 0 (7) | 5 (-11) | -31 (-29) | -7 (-13) |
| $(10, 25]\%$ | -46 (-35) | -8 (-10) | 0 (4) | -5 (-11) | -35 (-34) | -5 (-14) |
| $(25, 50]\%$ | -72 (-46) | -14 (-12) | 5 (9) | -65 (-14) | -58 (-43) | 2 (-14) |
| $> 50\%$ | -54 (-65) | -17 (-24) | -11 (2) | -71 (33) | -74 (-65) | -6 (-22) |
| Momentum | | | | | | |
| $\leq -0.1$ | -32 (-32) | -7 (-7) | 2 (11) | -29 (-48) | -28 (-34) | -4 (-9) |
| $(-0.1, -0.02]$ | -47 (31) | -7 (-4) | 1 (11) | 30 (-15) | -35 (-24) | -6 (-3) |
| $(-0.02, 0.02]$ | -37 (-17) | -7 (-4) | 0 (4) | -31 (-13) | -29 (-16) | -5 (-3) |
| $(0.02, 0.1]$ | -34 (-15) | -8 (-3) | 3 (1) | -25 (-30) | -30 (-14) | -4 (-4) |
| $> 0.1$ | -33 (-22) | -8 (-5) | 5 (0) | -40 (-42) | -26 (-23) | -6 (-7) |

Table 3: Average trading costs (in basis point) for various categories and benchmarks of the sample, where equally weighted averages are shown in brackets.

Fig. 3

| Category | $C_T$ | $V_T$ | $C_{T-1}$ | $C_{T-20}$ | $O_T$ | $M_T$ |
|---|---|---|---|---|---|---|
| All | -70 (-22) | -27 (-13) | 9 (0) | -3 (-26) | -58 (-22) | -75 (-34) |
| Type | | | | | | |
| Growth | -74 (-22) | -26 (-13) | 12 (0) | -3 (-26) | -59 (-21) | -72 (-35) |
| Value | -68 (-19) | -27 (-11) | 1 (-2) | 6 (-27) | -58 (-19) | -75 (-28) |
| Micro cap | -216 (-134) | -105 (-69) | 17 (-24) | 27 (-32) | -182 (-134) | -190 (-152) |
| Market Cap | | | | | | |
| Large cap | -44 (-9) | -13 (-4) | 6 (2) | 7 (2) | -37 (-8) | -48 (-13) |
| Mid cap | -79 (-8) | -33 (-7) | 19 (2) | -15 (-21) | -66 (-9) | -83 (-26) |
| Small cap | -79 (-8) | -33 (-7) | 19 (2) | -15 (-21) | -66 (-9) | -83 (-26) |
| Side | | | | | | |
| Buy | 41 (8) | 16 (-12) | -107 (-34) | -335 (-328) | 21 (-3) | -51 (-29) |
| Sell | -181 (-57) | -69 (-14) | 124 (39) | 327 (332) | -137 (-44) | -98 (-40) |
| Market | | | | | | |
| Listed | -54 (-15) | -20 (-9) | 1 (-1) | 1 (-23) | -47 (-15) | -63 (-22) |
| OTC | -125 (-37) | -48 (-23) | 35 (0) | -14 (-33) | -97 (-36) | -101 (-57) |
| Size | | | | | | |
| $\leq 1\%$ | -32 (-11) | -11 (-8) | 2 (-1) | -18 (-30) | -26 (-12) | -32 (-22) |
| $(1,5]\%$ | -56 (-58) | -20 (-29) | 6 (0) | 13 (-24) | -46 (-54) | -52 (-72) |
| $(5,10]\%$ | -71 (-73) | -26 (-36) | 11 (5) | 32 (8) | -59 (-69) | -67 (-94) |
| $(10,25]\%$ | -78 (-83) | -30 (-40) | 4 (0) | 14 (6) | -67 (-78) | -85 (-110) |
| $(25,50]\%$ | -76 (-98) | -16 (-47) | -12 (-8) | -28 (7) | -61 (-91) | -106 (-146) |
| $> 50\%$ | -139 (-132) | -68 (-77) | 47 (-1) | -44 (41) | -115 (-125) | -150 (-210) |
| Momentum | | | | | | |
| $\leq -0.1$ | -102 (-51) | -62 (-32) | 11 (-6) | -38 (-94) | -99 (-55) | -131 (-70) |
| $(-0.1,-0.02]$ | -80 (-26) | -29 (-13) | 0 (-2) | 11 (-18) | -67 (-23) | -78 (-34) |
| $(-0.02, 0.02]$ | -67 (-13) | -21 (-8) | 24 (1) | -16 (-10) | -49 (-13) | -66 (-25) |
| $(0.02, 0.1]$ | -57 (-18) | -24 (-11) | 0 (1) | 7 (-31) | -52 (-18) | -70 (-31) |
| $> 0.1$ | -84 (-34) | -37 (-22) | 11 (2) | -15 (-51) | -71 (-36) | -106 (-60) |

Table 4: Order based dollar and equally weighted a Average trading costs (in basis points) for various categories and benchmarks of the sample, where equally weighted averages are in brackets.

Fig. 4

SYSTEM AND METHOD FOR ESTIMATING TRANSACTION COSTS RELATED TO TRADING A SECURITY

RELATED CASES

This application is based on and claims priority to provisional patent application No. 60/464,962 filed on Apr. 24, 2003, the entire contents of which are incorporated herein by reference.

BACKGROUND OF THE INVENTION

The performance of an investment is strongly related to execution costs related to the investment. Often with trading securities, transaction costs may be large enough to substantially reduce or even eliminate the return of an investment strategy. Therefore, achieving the most efficient order execution is a top priority for investment management firms around the globe. Moreover, the recent demand of some legislators and fund shareholder advocates of greater disclosure of commissions and other trading costs makes their importance even more pronounced (see, for example, Teitelbaum [14]). Therefore, understanding the determinants of transaction costs and measuring and estimating them are imperative. For further discussion see, for example, Domowitz, Glen and Madhavan [5] and Schwartz and Steil [13].

Traditionally, there appear to be two different approaches for estimating trading costs. The first approach is purely analytical and emphasizes mathematical/statistical models to forecast transaction costs. Typically, these models are based on theoretical factors/determinants of transaction costs and take into account, for instance, trade size and side, stock-specific characteristics (e.g., market cap, average daily trading volume, price, volatility, spread, bid/ask size, etc.), market and stock-specific momentum, trading strategy, and the type of the order (market, limit, cross, etc.).

The modeling is focused primarily on price impact and, sometimes, opportunity cost. For example, Chan and Lakonishok [4] report that institutional trading impact and trading cost are related to firm capitalization, relative decision size, identity of the management firm behind the trade and the degree of demand for immediacy. Keim and Madhavan [9] focus on institutional style and its impact on their trading costs. They show that trading costs increase with trading difficulty and depend on factors like investment styles, order submission strategies and exchange listing. Breen, Hodrick and Korajczyk [2] define price impact as the relative change in a firm's stock price associated with its observed net trading volume. They study the relation between this measure of price impact and a set of predetermined firm characteristics. Typically, some of these factors are then selected and implemented in mathematical or econometrical models that provide transaction cost estimates depending on different trade characteristics and investment style. ITG ACE™ (*Agency Cost Estimator*), described in [7] is an example of an econometric/mathematical model that is based on such theoretical determinants. It measures execution costs using the implementation shortfall approach discussed in Perold [12]. See also [15] and [16] for other examples of this type of model.

While the first approach implicitly assumes that past execution costs do not entirely reflect future costs, the second approach is specifically based on this principle. In the second approach, the focus is exclusively on the analysis of actual execution data, and resulting estimates are used primarily for post-trade analysis. Typically, executions are subdivided into segments called peer groups, then simple average estimates of transaction costs in each segment are built. Taking empirical averages, however, might cause problems. For example, very often cells with insufficient amount of data may provide inaccurate and inconsistent estimates due to just several outliers.

The present invention incorporates ideas of both approaches above to provide an improved method for estimating transaction costs.

SUMMARY OF THE INVENTION

According to the present invention, a method is provided for estimating transaction costs for financial transaction—preferably equity trades. Estimates are built using historical execution data, which is split into different peer groups. However, instead of calculating simple average estimates, a more sophisticated methodology is applied to historical execution data to produce more robust and consistent forecasts.

According to an embodiment of the present invention, a method is provided for creating a peer group database, which includes a step of collecting security transaction data for a preselected period of time, for a plurality of investment institutions. The transaction data includes identity of securities being traded, transaction order sizes, execution prices and execution times. The transaction data is grouped into a plurality of orders. A plurality of cost benchmarks are calculated for each of the orders. Transaction costs are estimated for each investment institution relative to the cost benchmarks. The data is stored. Other objects, advantages and features of the invention that may become hereinafter apparent, the nature of the invention may be more clearly understood by reference to the following detailed description of the invention, the appended claims, and the drawings attached hereto.

According to another embodiment of the present invention, a method for ranking a first institutional investor's security transaction cost performance relative to transaction costs of other institutional investors is provided. The method includes a step of collecting security transaction data for a preselected period of time, for a plurality of investment institutions. The transaction data includes identity of securities being traded, transaction order sizes, execution prices, momentum and execution times. The transaction data is grouped into a plurality of orders. A plurality of cost benchmarks are calculated for each of the orders. Transaction costs are estimated for each investment institution relative to the cost benchmarks. The first institutional investor is ranked against the plurality of investment institutions for at least one of a number of factors.

According to another embodiment of the present invention, a system is provided for ranking a first institutional investor's security transaction cost performance relative to transaction costs of other institutional investors. The system includes a processing means for collecting security transaction data for a preselected period of time, for a plurality of investment institutions. The transaction data includes identity of securities being traded, transaction order sizes, execution prices, momentum and execution times, grouping said transaction data into a plurality of orders. The processing means calculates a plurality of cost benchmarks for each of the plurality of orders, estimates transaction costs for each investment institution relative to the cost benchmarks, and ranks the first institutional investor against the plurality of investment institutions for at least one of a number of factors. The system also includes a storing means for receiving data from the processing means, storing said data, and making data available to the processing means.

According to another embodiment of the present invention, a system is provided for ranking a first institutional investor's security transaction cost performance relative to transaction costs of other institutional investors. The system includes a processing unit and a database unit. The processing unit is coupled with a network and configured to collect security transaction data for a pre-selected period of time, for a plurality of investment institutions. The transaction data includies identity of securities being traded, transaction order sizes, execution prices, momentum and execution times. The processing unit is also configured to group the transaction data into a plurality of orders, to calculate a plurality of cost benchmarks for each of said plurality of orders, to estimate transaction costs for each order relative to the cost benchmarks, and to store the data in a database. The database unit is coupled with the processing unit and configured to communicate with the processing unit, store data and making data available to the processing unit.

BRIEF DESCRIPTION OF THE DRAWINGS

The invention will be described in detail with reference to the following drawings, in which like features are represented by common reference numbers and in which:

FIG. 1 shows the preferred values ranges in codes of categories for cost factors according to an embodiment of the present invention;

FIG. 2 shows exemplary ranges and values for the cost factors shows in Table 1 of FIG. 1;

FIG. 3 shows average trading costs for various categories and benchmarks of the sample shown in FIG. 2;

FIG. 4 shows order based dollar and equally weighted average trading costs for various categories and benchmarks of the sample shown in FIG. 2;

DETAILED DESCRIPTION OF THE PREFERRED EMBODIMENTS

Figure 5:
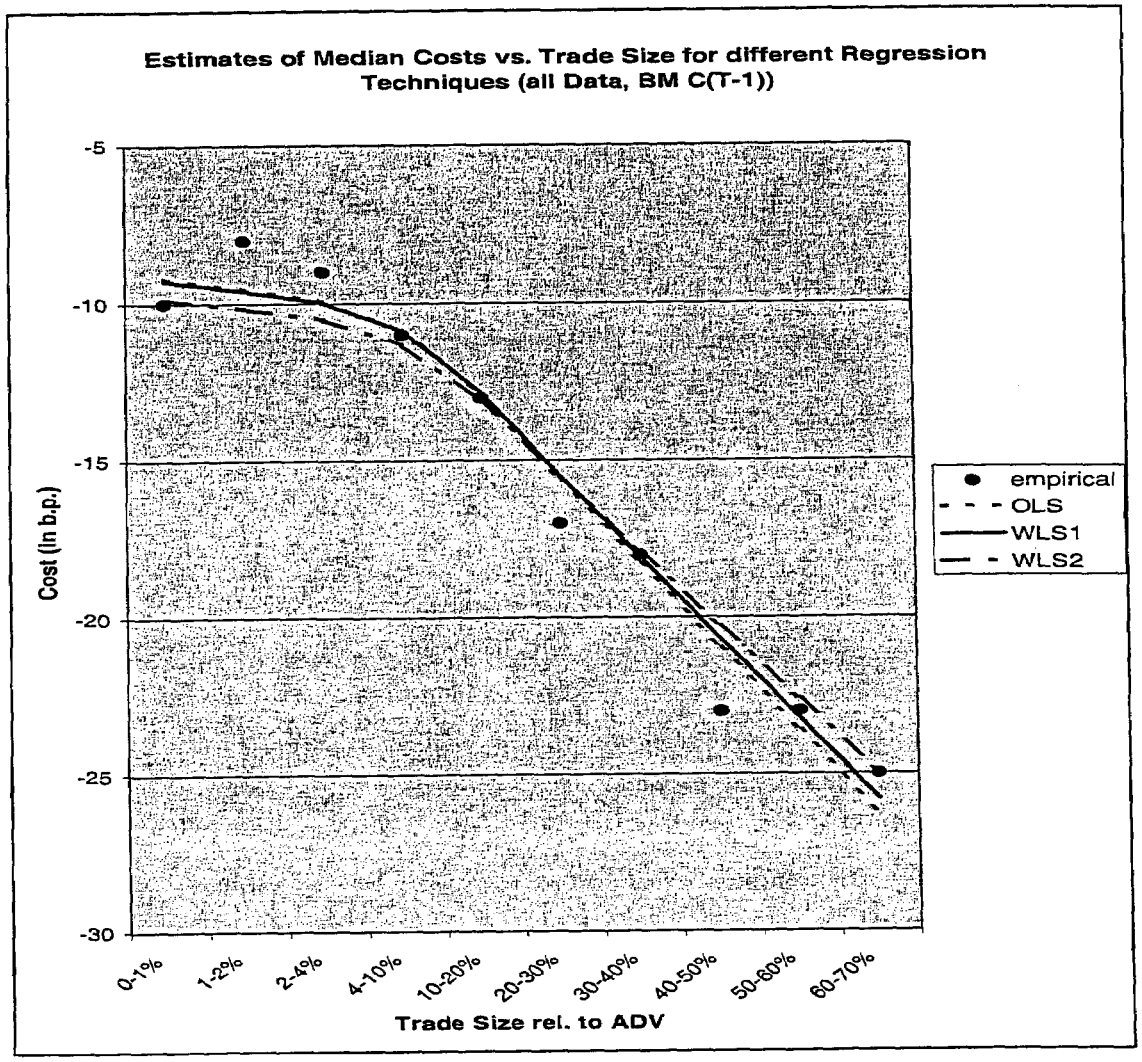
FIGS. 5-6 are graphs which compare medium cost estimates obtained through different regression techniques.

The present invention provides a novel system and method for estimating financial transaction costs associated with trading securities, and comparing institutional performance among peer institutions. Transactional data from various peer institutions is collected and analyzed on a periodic basis to create comprehensive data relating to transactions, order and executions. The data can be manipulated and presented to a peer institution so that they can benchmark their performance against their competitors. Costs are measured by comparing the costs of a trade or order by an institution to one or more benchmarks, and then comparing costs between institutions for similar stocks under similar situations.

The present invention will help institutional investors to manage their trading costs more efficiently by ranking the performance of investors relative to other peer group participants. The present invention will stimulate institutional investors to enhance their analytical environment using the most efficient trading execution tools (e.g., POSIT®, TriAct™, ITG SmartServers™, etc.) as well as advanced trading analytical products (e.g., TCA, ITG Opt™, ITG ACE™, Res-Risk™, etc.).

For the purpose of describing the present invention, orders are block orders of securities requiring the buying or selling of one thousand or more shares of at least one security.

The present invention includes systems and methods for providing security transaction costs. The methodology is described first, followed by exemplary embodiments of systems for implementing the same. One skilled in the art will readily comprehend that the invention is not limited to the embodiments described herein, nor is it limited to specific programming techniques, software or hardware.

A framework with two different clusterization approaches is provided: single executions and orders. Trades submitted by the same institution with the same order identifier, side and stock are assumed to belong to the same order.

To build the cost estimates, the transaction cost of each trade or order/trading decision are estimated against a number of benchmarks. Though the true costs to an institutional trader may include costs such as commission costs, the administrative costs of working an order, as well as the opportunity costs of missed trades, the present invention focuses primarily on costs represented by price impact. This price impact can be explained as the deviation of the executed price from an unperturbed price that would prevail had the trade not occurred.

The following benchmarks can be used for estimating transaction costs:

$C_{T-1}$—the closing price of the stock on the day prior to the day of execution for executions (or on the day prior to the trading decision for orders);

$V_T$—the volume-weighted average price (VWAP) across all trades during the first day of the trade execution for executions (or during the first trading day of the period over which the decision was executed for orders);

$C_{T+1}$—the closing price of the stock on the first day after execution for executions (or on the first day after the last fill of the decision for orders);

$C_{T+20}$—the closing price of the stock on the 20th day after execution for executions (or on the 20th day after the first trading day of the period over which the decision was executed for orders);

$O_T$—the open price of the stock on the day of execution for executions (or on the day of trading decision for orders); and $M_T$—the prevailing midquote of the stock prior to execution time for executions (or prior to time of trading decision for orders).

Benchmark $C_{T-1}$ is described more fully in Perold [12]. Benchmark $V_T$ is described in detail by Berkowitz, Logue, and Noser [1]. The benchmark $M_T$ is, probably, the purest form of unperturbed price that one could choose as opposed to $C_{T-1}$, for example, because it does not depend on other trades that occur between closing and time of execution. All three benchmarks ($C_{T-1}$ $V_T$ and $M_T$) are widely used in practice both for cost measurement and trading performance evaluation, and will be understood by one of ordinary skill in the art. Although the benchmark VWAP is widely used, it is generally not considered to be appropriate for evaluation of large order executions, because it can be "gamed" by avoiding trading late in the day if prices appear to be worse than the VWAP price. See, for instance, Madhavan [11] for more details and Lert [10] for analysis of differences between various cost measurement methods.

Transaction costs can be calculated in basis points according to the formula: $[(P^\wedge-P_b)/P_b]*\delta*10,000$ (Eq. 1); where $P^\wedge$ is the actual execution price, $P_b$ is the benchmark price and $\delta$ is set to 1 or −1 in case of a sell or buy order, respectively. Positive trading costs show outperformance, which means that the trading decision resulted in profit.

To compare transaction costs of one peer institution against the costs of other peer institutions under similar circumstances, cost estimates for median and other percentiles for each comparison framework are built into a database, or other storage means, called a Peer Group Database (PGD). A graphical user interface is preferably provided to allow users to view relative peer performance by both traditional measures, as well as trade characteristics. More precisely, trading costs of executions/orders can be grouped by a number of market and stock-specific cost factors, such as type, market capitalization, side market, market, size (represented by a percentage of average daily trading volume), and short-term momentum. These factors define scenarios. The preferred values and ranges of the exemplary cost factors are presented in FIG. 1.

The six cost factors listed above have a significant impact on transaction costs, but numerous other factors are contemplated to be used, for instance, broker type (alternate broker, full-service broker, research broker, etc.), order type (market, limit, cross), daily volatility, and the inverse of dollar price of a stock (see e.g., Werner [17] or Chakravarty, Panchapagesan and Wood [3]).

It is important to note that adding too many factors to the PGD may have some disadvantages. For example, the product resulting could become more complicated, but most importantly, if the amount of transaction data does not increase dramatically, the accuracy of estimates will deteriorate as the number of observations for each segment becomes insufficient.

Referring to FIG. 1, the factor Type is preferably divided into Growth or Value stocks based on the methodology used by Russell 3000® in its indices (Russell is a registered trademark of the Frank Russell Company). Micro cap stocks are defined as stocks that are neither Growth nor Value stocks and have a market capitalization lower than 250 million dollars. Note that, by construction, it may happen that a stock belongs to both Growth and Value categories.

The factor Market Capitalization classifies stocks into three market capitalization groups. For executions, the Market Capitalization is always based on the closing stock price $C_{T-1}$ of the day prior to execution. For orders, the Market Capitalization is based on the closing stock price $C_{T-1}$, but on the day prior to trading decision. The threshold for Small cap stocks is 1.5 billion dollars. The threshold for Mid cap stocks is 10 billion dollars.

The factor Side comprises of two categories: Buy and Sell. Preferably, no distinction is made between normal sells and short sells.

For U.S. applications, the factor Market subdivides stocks in two categories: Listed and over-the-counter (OTC) stocks. However, for other international applications, the Market factor can be subdivided into any number of categories.

The Size factor captures the (total) trade size of an execution (order). Size is measured relative to the average daily share volume (ADV), which is defined as the median daily dollar volume of the latest twenty-one trading days divided by the closing stock price of the day prior to execution, for executions, and the day prior to the trading decision for orders.

The factor short-term Momentum is measured over the last two days prior to execution. Momentum measures the price evolution of a stock within the last two trading days as a fraction of absolute price changes. Specifically, $$M = (Q_n - Q_0) / \left( \sum_{i=1}^{n} |Q_i - Q_{i-1}| \right),$$  Eq. (2)

where $Q_o$ and $Q_n$ are the midpoints of the first and last valid primary quotes of the most recent two trading days and $Q_i$, 0<i<n, is the midpoint of the i'th valid primary quote occurring immediately prior to each valid primary trade of the most recent two trading days. Succinctly, a valid primary quote or trade is a quote or trade of a stock that occurred under regular market conditions on the stock's primary exchange.

The categories of each factor are preferably restricted to be used with other categories as follows: Type categories Value and Growth can be selected only with factors Market Capitalization and Side, and Type category Micro cap can be selected only with the factor Side.

For scenarios that do not use the factors Size and Momentum, empirical distributions can be natural estimates for peer cost distributions. However, this is not true for the other cases. It is compelling that cost estimates should be consistent and close to each other for close values of size and momentum. In other words, the ranks of realized costs for two very similar scenarios should not differ very much.

The present invention provides robust and consistent peer cost estimates for any choice of factors: Market Capitalization, Side, Market, Size and Momentum. Since Type is used in the present invention in conjunction with the factors Market Capitalization and/or Side only, it is not considered for simplicity. However, one having ordinary skill in the art will understand that factor Type can be easily incorporated in the methodology of the present invention.

The methodology of the present invention provides estimates for cost percentiles for any values of Size and Momentum from [0,∞) and [−1,1], respectively. Therefore, the methodology provides much more flexibility than actually needed when values of Size and Momentum are subdivided into different groups, and can be applied even if the choice of the ranges for Size and Momentum is different from the ones shown above.

The present invention is described next by way of example. Estimation methodology is based on US execution data from January 2002 to December 2002 submitted by users of TCA. In this sample, the institutional trades represented 91 firms. All institutions together accounted for 14.6 million trades, 82.7 billion shares and 2,067 billion total dollar value. The trades were clusterized into 6.4 million orders; an average order consisted of 2.3 executions.

FIG. 2 shows descriptive statistics for the entire sample and its sub-samples based on the categories for each cost factor. The table presents the following information: the number of executions, the number of orders, the number of shares traded, the number of stocks (identified by unique cusips) traded and total dollar volume. Statistics for factor Type show that the subdivision between Growth and Value stocks was quite even. Only a minority of executions and orders belongs to the Micro-cap category, although it contains the largest amount of stocks. The subdivision with respect to market capitalization seems to be justified—executions and orders are evenly distributed among the three groups. As shown, the number of large cap stocks was the lowest, but the total dollar value is the highest, Small cap stocks are in the majority, while the dollar volumes of buy and sell orders are approximately the same. Interestingly, the average size of sell a orders is larger than the average size of buy orders. The overwhelming majority of executions and orders belong to the smallest size group, i.e. less than or equal to 1% of ADV. This raises another challenge on building reasonable and robust cost estimates for the entire framework, including large trades and orders. Finally, the statistics for the momentum subdivision show that the majority of values of the momentum are close to zero. Moreover, negative values for momentum seem to outnumber the positive ones, which is expected due to the overall market trend for the period.

Analysis of Average Realized Transactions

FIGS. 3-4 present average transaction costs for different factors, benchmarks and clusterization types. For each scenario, two average costs are provided. The first value is the dollar weighted average trading cost, whereas the number in parenthesis indicates the equally weighted average trading cost. Note that dollar weighted and equally weighted averages are very different in most of the cases. By construction, the dollar weighted average depends mostly on a few large trades/orders only. In cases of symmetric distributions, the equally weighted average is identical to the median. From this perspective, the equally weighted averages can be more appropriate to analyze characteristics of peer group cost distributions.

FIG. 3 shows average transaction costs for executions for various categories of factors for six preferred benchmarks. Regarding the average trading costs for the benchmarks $C_{T-1}$, $O_T$ and $M_T$; growth stocks appear to have slightly higher average trading costs than Value stocks; by definition, Microcap stocks are very illiquid and thus encounter much higher average transaction costs. It is apparent from the values in FIG. 3 that trading costs are inversely related to Market Capitalization, and listed stocks have lower average costs than OTC stocks, supposedly, due to the fact that OTC stocks are, in general, more volatile. It can be observed that, on average, sell trades have positive costs while buys appear to have negative average costs. This observation holds for benchmarks $C_{T-1}$ and $O_T$, which is very likely due to the overall negative market movement within the selected period. This assumption is confirmed by the reversed signs of average costs for sells and buys for post trade benchmarks $C_{T+1}$ and $C_{T+20}$. As expected, average trading cost decreases as trade size increases. No specific pattern could be found for the average trading costs in different momentum categories.

For benchmark $V_T$, it is observed that most of the average costs are concentrated around zero for all categories that have been studied. The highest absolute value of average costs is 17 b.p. Average costs for Growth and Value stocks are close, while costs for Micro cap stocks are significantly negative. Similarly to the previous benchmarks, average trading costs seem to be inversely related to market capitalization and OTC stocks appear to have higher average costs than Listed stocks. However, in contrast to the pre-trade benchmarks, there is little difference between average costs for buys and sells (at least for the dollar weighted averages), which is likely due to the fact that, by construction, the VWAP benchmark is set for the day and is not affected by price movement within each day. Average cost behavior for Size and Momentum factors for $V_T$ is similar to the case of pre-trade benchmarks.

The post-trade benchmarks $C_{T+1}$ and $C_{T+20}$ yield quite different results. Benchmark $C_{T+20}$ provides average costs that fluctuate substantially, for example, both dollar and equally weighted average costs have inverse signs for the same categories in some cases. Basically, the benchmark $C_{T+20}$ does not seem to indicate any meaningful measure for price impact. Benchmark $C_{T+1}$ provides average costs that have the reversed behavior of the pre-trade benchmark $C_{T-1}$. Costs overall are mostly positive, which indicates that on average, peer institutions have strong performance with respect to this benchmark. Micro cap stocks have the highest positive costs and executions of OTC stocks outperform those of Listed stocks.

The analysis shows that average realized transaction costs of the exemplary data set are in line with empirical results presented by other researchers (see, for instance, Chakravarty, Panchapagesan and Wood [3]). The results strongly confirm that measuring costs with respect to different benchmarks affects performance evaluation significantly. In light of this fact, it seems to be a challenge to build a methodology that can be efficiently applied for all benchmarks discussed above.

FIG. 4 displays analogous results for orders.

Peer cost percentiles can be estimated for all benchmarks, clusterization types and possible choices of scenarios, assuming that at least one of the factors Size and Momentum has been selected. More precisely, the main result is to derive estimates of cost percentiles:

$$X_i = \text{CostPercentile}_{MarketCap=y1, Side=y2, Market=y3, Size=y4, Momentum=y5}(i), \quad \text{Eq. (3)}$$

where y=(y1, y2, y3, y4, y5) are arbitrary values for factors Market Capitalization, Side, Market, Size and Momentum, i∈[0,100], and costs are measured relative to one of the six benchmarks discussed above.

Before estimating $X_i$ in Eq. (3), one must note that, first, while the factors Market Capitalization, Side and Market are discrete, Size and Momentum can have any values from $[0,\infty)$ and $[-1,1]$, respectively. Consequently, Eq. (3) consists of an infinite number of functions and thus, an infinite number of estimates have to be derived. Second, a pure empirical approach might not be practical in all cases. Subdividing factors Size and Momentum into different groups and computing the empirical distribution for each scenario may lead to inconsistency and instability. As a result, performance of costs realized from two very similar scenarios may be ranked very differently, which may be confusing for users. Third, it is preferred to have a methodology that provides robust estimates and that works for both clusterization types and all six benchmarks $C_{T-1}$, $V_T$, $C_{T+1}$, $C_{T+20}$, $O_T$ and $M_T$. This requirement is important since various benchmarks (for instance, $V_T$ and $C_{T-1}$) have very different properties.

In provisional application No. 60/464,962, an ordinary least squares (OLS) methods method is described for providing estimates. The present invention does not focus on the mean or median only, but also provides estimates for the 25th, 40th, 60th and 75th costs percentiles in addition to the median. Instead of regressing all the cost percentiles in the comparison framework directly on the (total) trade size and momentum values, the present invention subdivides the comparison framework into different groups depending on the Momentum and Size of the executions (orders). Then, for each group, the 25th, 40th, 50th (median), 60th and 75th cost percentiles, are determined, as well as the equally weighted average values of momentum and (total) trade size.

Similar to the simple OLS approach, based on research conducted, all five percentiles are assumed to depend linearly on functions f and g of size and momentum, or, specifically, $$X_i = \alpha_i + \beta_i f(S) + \gamma_i g(M) + \epsilon_i, \; i=25, 40, 50, 60 \text{ or } 75. \quad \text{Eq. (4)}$$

Moreover, based on empirical research, it is assumed that f is positive, monotonely increasing, f(0)=0, and g is either $$g(x)=x \text{ or } g(x)=|x|^\nu, \text{ for some } \nu>0.$$

A possible choice for f is $f(x)=x^\mu$, for x>0 and some $\mu>0$.

In order to have a rough estimate for the whole peer cost distribution of a scenario, the percentiles between 25 and 75 can be computed by linear interpolation. Since transaction cost distributions are heavy-tailed, percentiles below 25 and above 75 are derived assuming Pareto type of distributions.

Different regression estimation techniques can be chosen to estimate the regression parameters ($\alpha_i$, $\beta_i$, $\gamma_i$) in Eq. (4) by regressing the cost percentiles (i) on average values of momentum and size. Groups without sufficient number of observations are preferably skipped from the regression in order to reduce noise as much as possible and ensure stability of the estimates. The present invention focuses on the following three regression techniques: (a) ordinary least squares (OLS), (b) weighted least squares (WLS) with respect to OLS residuals (WLS1), and (c) WLS with respect to observations in each subdivision (WLS2).

The WLS1 approach is an enhancement of the OLS approach and comprises two steps: first, OLS regression is conducted and the residuals of the regression are determined; and second, the parameters are reestimated by weighting the observations with the inverse of their squared residuals. In order to avoid abnormal weighting, inverses of the squared residuals are truncated by the value $$\left( \sum_{i=1}^n e_i^2 \right)^{-1}.$$

Estimates become more robust due to the weighting. Moreover, based on research, squared residuals are generally the highest for large groups with large trade and order sizes. Weighting by the residuals increases the importance of cost percentiles for groups with smaller sizes. This is desirable since executions (and orders) with small (total) trade sizes are in the majority as pointed out above.

Method WLS2 weights the importance of each group in a different way. Instead of weighting by the OLS residuals, WLS2 takes into consideration the amount of observed data in each subdivision and thus weights by the number of observations in each group. The problem with this method is that the number of observations might vary dramatically from group to group according to the data. The approach might yield reasonable results for some scenarios (usually for small trade sizes and momentum values close to zero) but provide bad estimates overall.

The present invention has the advantage that it provides more information about the whole peer cost distribution. Moreover, it filters out outliers in a natural way by taking medians (and other percentiles) in each group. However, it should be noted that there is no theoretical justification how to subdivide groups optimally, and regressing percentiles on the average size and momentum is only an approximation.

Figure 6:
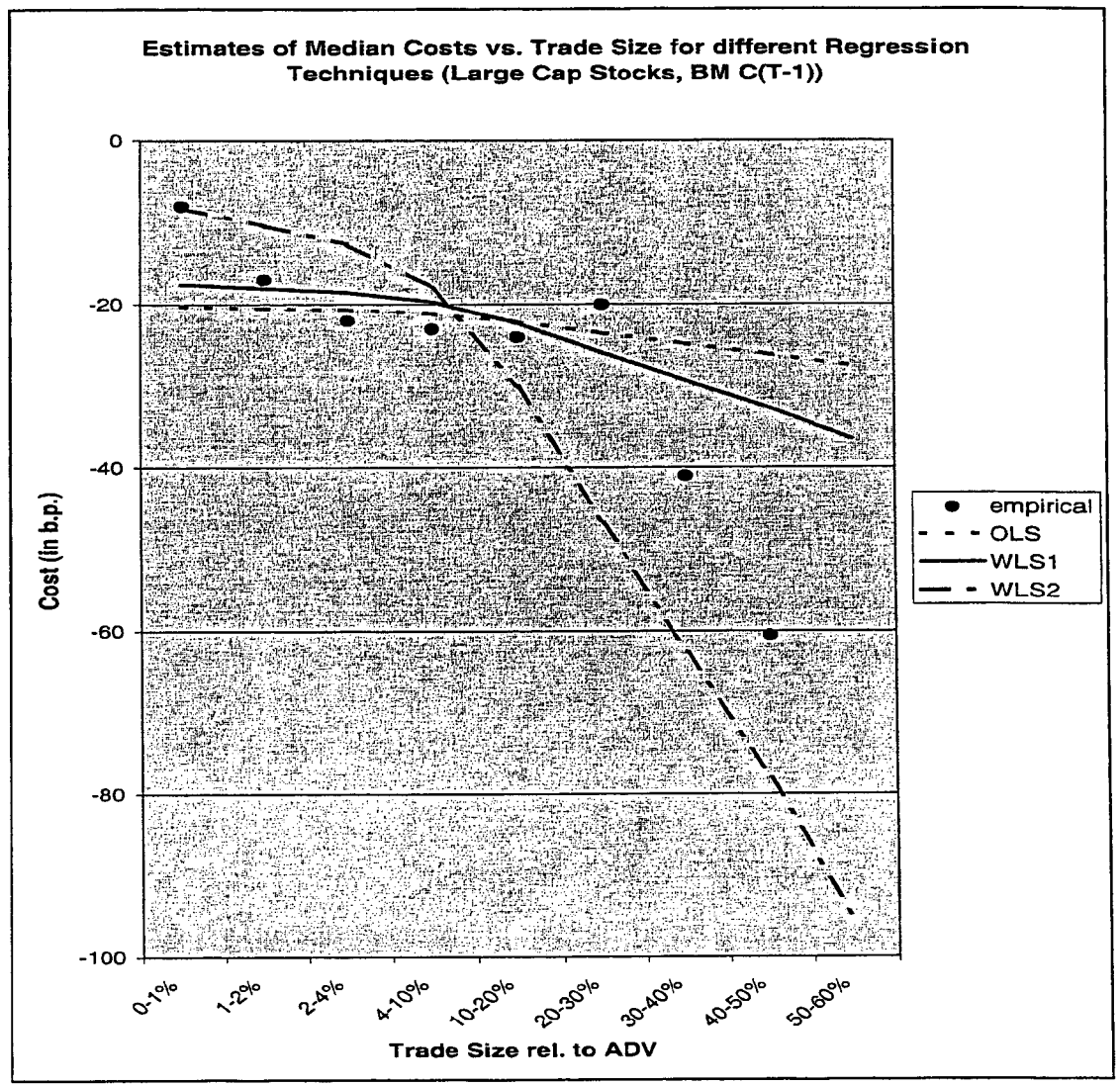
Figure 7:
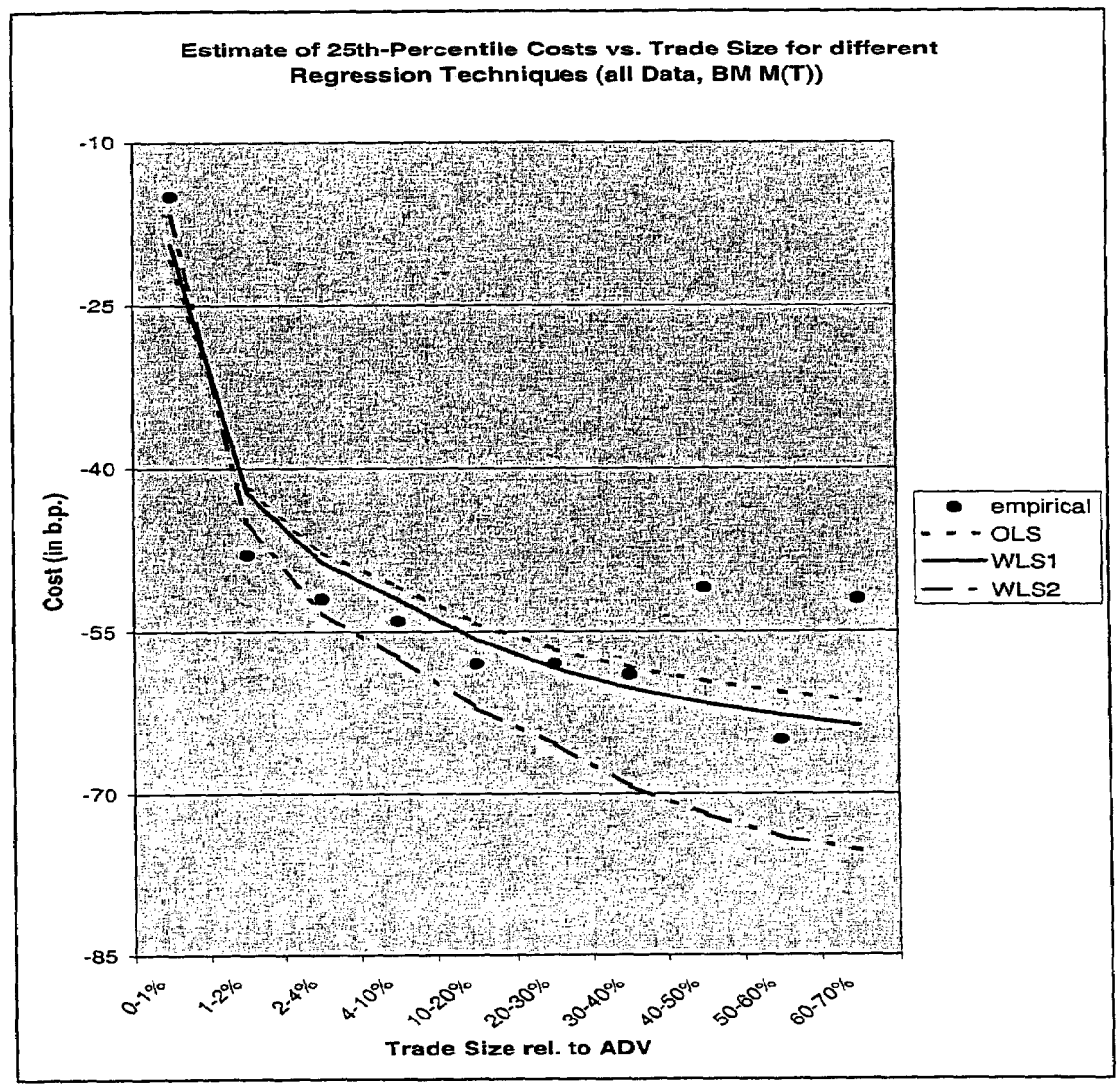
FIG. 7 is a graph comparing the $25^{th}$/percentile estimates obtained for different regression techniques.

FIGS. 5-7 provide comparison of the results for these three regression techniques. In each figure, the empirical percentiles are annotated by points.

FIG. 5 compares median cost estimates obtained by OLS, WLS1 and WLS2 with empirical median costs. The dots denote the empirical medians. The solid line indicates the estimated median costs using the regression techniques WLS1. The two dotted lines show median cost estimates for OLS and WLS2. All estimates have been derived using regression Eq. (4) for all executions in our data sample with f(x)=x and g(x)=0. Costs are measured relative to benchmark $C_{T-1}$. Empirical percentiles have been regressed on average size and momentum values, i.e. f(x)=x and g(x). The chart illustrates that all regression methods provide good estimates.

FIG. 6 compares median cost estimates obtained by OLS, WLS1 and WLS2 with empirical median costs. The dots denote the empirical medians. The solid line indicates the estimated median costs using the regression technique WLS1. The two dotted lines show median cost estimates for OLS and WLS2. All estimates have been derived using regression Eq. (4) for all executions of Large cap stocks in the data sample with f(x)=x and g(x)=0. Costs are measured relative to benchmark $C_{T-1}$. Instead of taking all executions into account, estimates have been derived for executions for Large cap stocks only. The functions f and g have been chosen linear again. Median cost estimates using OLS and WLS1 still do not differ considerably (WLS1 seems to yield slightly better results), however method WLS2 provides unreasonable estimates for large trade sizes.

FIG. 7 compares 25th-percentile estimates obtained by OLS, WLS1 and WLS2 with empirical 25th-percentiles of costs. The dots denote the empirical 25th-percentiles of costs. The solid line indicates the estimated 25th-percentile using the regression technique WLS1. The two dotted lines show 25th-percentile estimates for OLS and WLS2. All estimates have been derived using regression Eq. (4) for all executions in our data sample. f and g have been selected according to Eq. (7). Costs are measured relative to benchmark $M_T$. FIG. 7 shows 25th-percentile estimates for executions and benchmark $M_T$ using all data. By construction, WLS2 yields best results for small trade sizes, but underperforms the two other techniques when trade sizes increase.

FIGS. 5-7 are typical examples of the overall performance of the techniques of the present invention. WLS1 is the most appropriate method for estimation of the five cost percentiles overall and provides consistent and robust estimates for all groups, for both executions and orders, and all benchmarks.

Regression Constraints

Special attention should be paid to the fact that, without assuming any constraints on the regression parameters: $\alpha_i$, $\beta_i$ and $\gamma_i$, i=25, 40, 50, 60 and 75, it could occur that for some pair (S, M), $$X_i = \alpha_i + \beta_i f(S) + \gamma_i g(M) < \alpha_j + \beta_j f(S) + \gamma_j g(M) = X_j, \text{ for } i>j \quad \text{Eq. (5),}$$

which is counterintuitive.

To avoid such situations, constraints have to be assigned to the regression parameters. The constraints depend on the choice of benchmark and of function g.

Accordingly, there are three restrictions for each scenario, benchmark and clusterization type. The first constraint suggests that for all cases, condition (5) should not hold for (S, M)=(O,O). In other words, we assume that $\alpha_i \geq \alpha_j$ for i>j.

The second restriction takes into consideration that dispersion of costs should increase or decrease as size increases depending on the benchmark and clusterization type. Precisely, for i>j, $\beta_i \leq \beta_j$ for benchmark $V_T$ and clusterization type "executions";

$\beta_i \geq \beta_j$ otherwise.

The last constraint depends on the choice of the function g and on the type of benchmark. Typically, it is a technical condition on the parameters $\gamma_i$ that ensures that (5) doesn't happen.

Finally, if any of these constraints is violated, the regression parameters ($\alpha_i$, $\beta_i$, $\gamma_i$) are adjusted relative to the median are ($\alpha_{50}$, $\beta_{50}$, $\gamma_{50}$). This approach guarantees that the medians, as the most important percentile estimates, have no regression constraints, and thus, remain unaffected by possible adjustments.

Selection of f and g

For each benchmark and clusterization type, several functions of f and g are chosen in regression Eq. (4). The linear functions f(x)=x and g(x)=x provide the good results for all benchmarks, except for $M_T$. Performance was measured via the average value of $R^2$ for regressions and the number of adjustments that had to be applied due to the regression constraints. Average $R^2$ of all possible scenarios was around 0.55 for the test set, and parameters had to be adjusted in approximately 30% of cases. The methodology had the best performance for benchmark $C_{T+20}$ and executions with average $R^2$=0.62, and the worst performance for the benchmark $M_T$ and executions with average $R^2$=0.45. It is assumed that the good performance for $C_{T+20}$ has the following explanation. As already mentioned above, benchmark $C_{T+20}$ is just a measure for general price movement and noise in the 20 day period. From this point of view, empirical cost percentiles for $C_{T+20}$ might depend on the underlying trades or orders, very little, and thus, the dependence on momentum and size values of the stocks traded will be weak as well. As a consequence, $\beta_i$ and $\gamma_i$ in Eq. (4) can be set to 0 so that Eq. (4) is transformed into $$X_i = \alpha_i + \epsilon_i, i=25, 40, 50, 60 \text{ or } 75. \quad \text{Eq. (6)}$$

The poor performance of $M_T$ can be explained by the completely different behavior of its cost percentiles. The prevailing midquote benchmark is, probably, the purest benchmark that can mimic the unperturbed price. For small trade sizes, execution prices are naturally bounded by the bid and ask quotes of a stock and thus, by definition, costs with respect to the prevailing midquotes are bounded as well. As a result, all five cost percentiles must lie very closely to each other, which, unfortunately, results in the violation of the regression constraints. Through empirical studies, it was determined that the functions $$f(x) = f_1(f_2(x)) \text{ and } g(x) = |x|^{3/4}, \quad \text{Eq. (7)}$$

where $$f_1(x) = x^{1/10} \text{ and } f_2(x) = \begin{cases} x^4/0.02^3, & x \leq 0.02 \\ x, & x > 0.02 \end{cases} \quad \text{Eq. (8)}$$

in regression Eq. (4) for benchmark $M_T$ yield the most satisfactory results.

The function $f_2$ transforms sizes of less than 2% of ADV into even smaller values. The transformation has the desired effect that percentile cost estimates of small trade sizes do not differ significantly. $f$, and g model the overall non-linear behavior of $X_i$ in the variables S and M, respectively.

Figure 8:
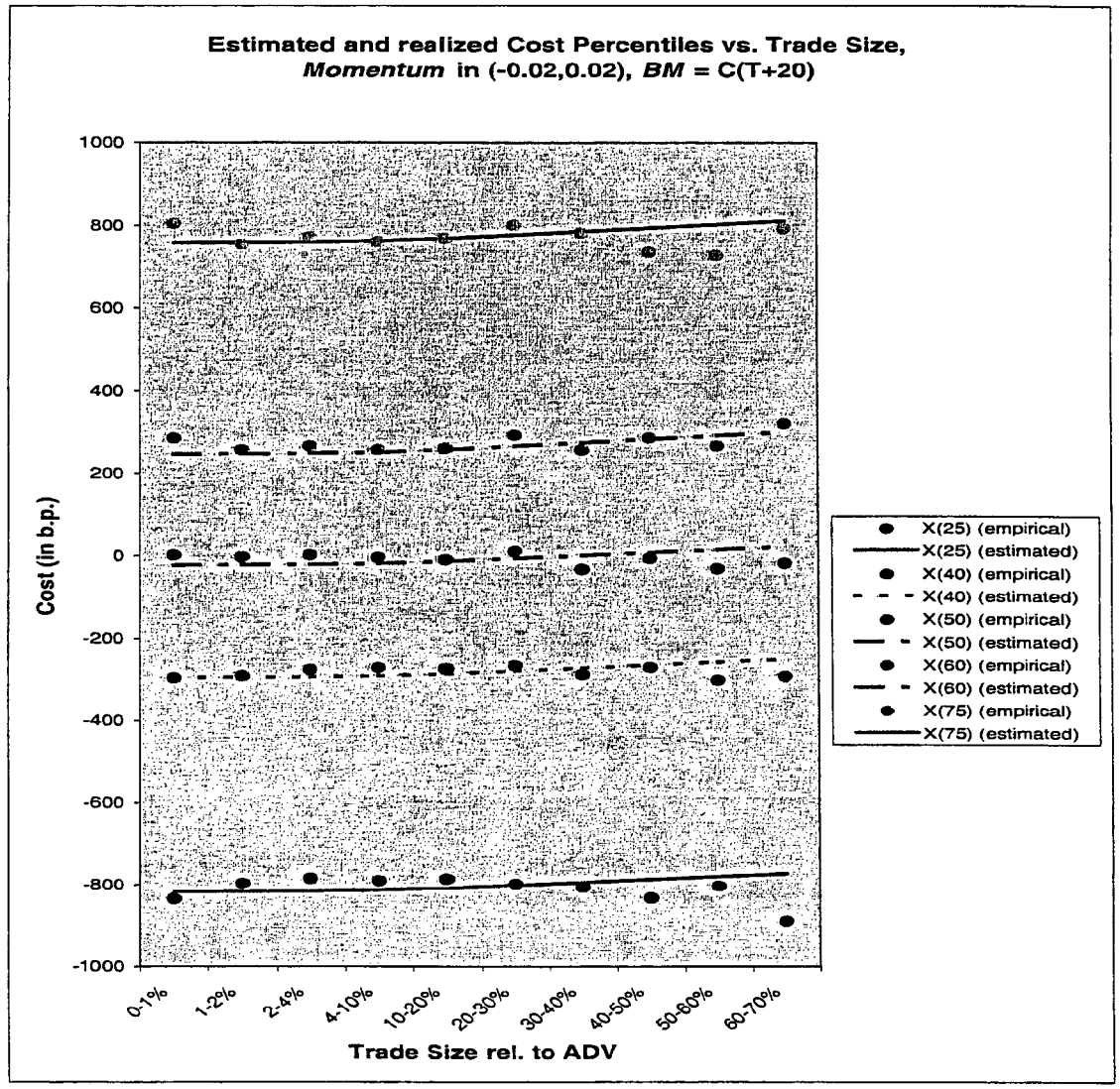
FIGS. 8-10 are graphs which compare estimated and realized cost percentile versus trade sizes.
Figure 9:
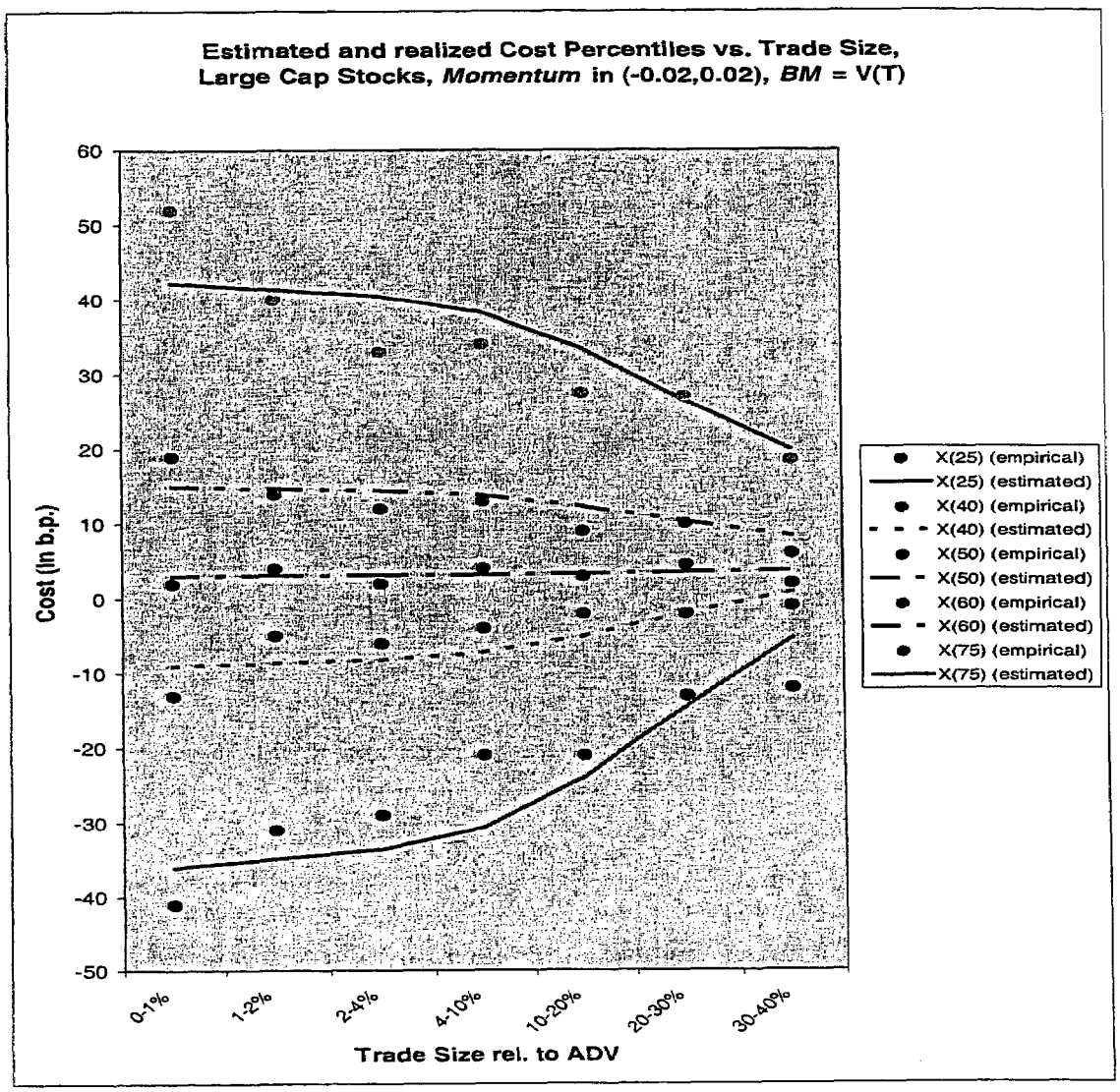
Figure 10:
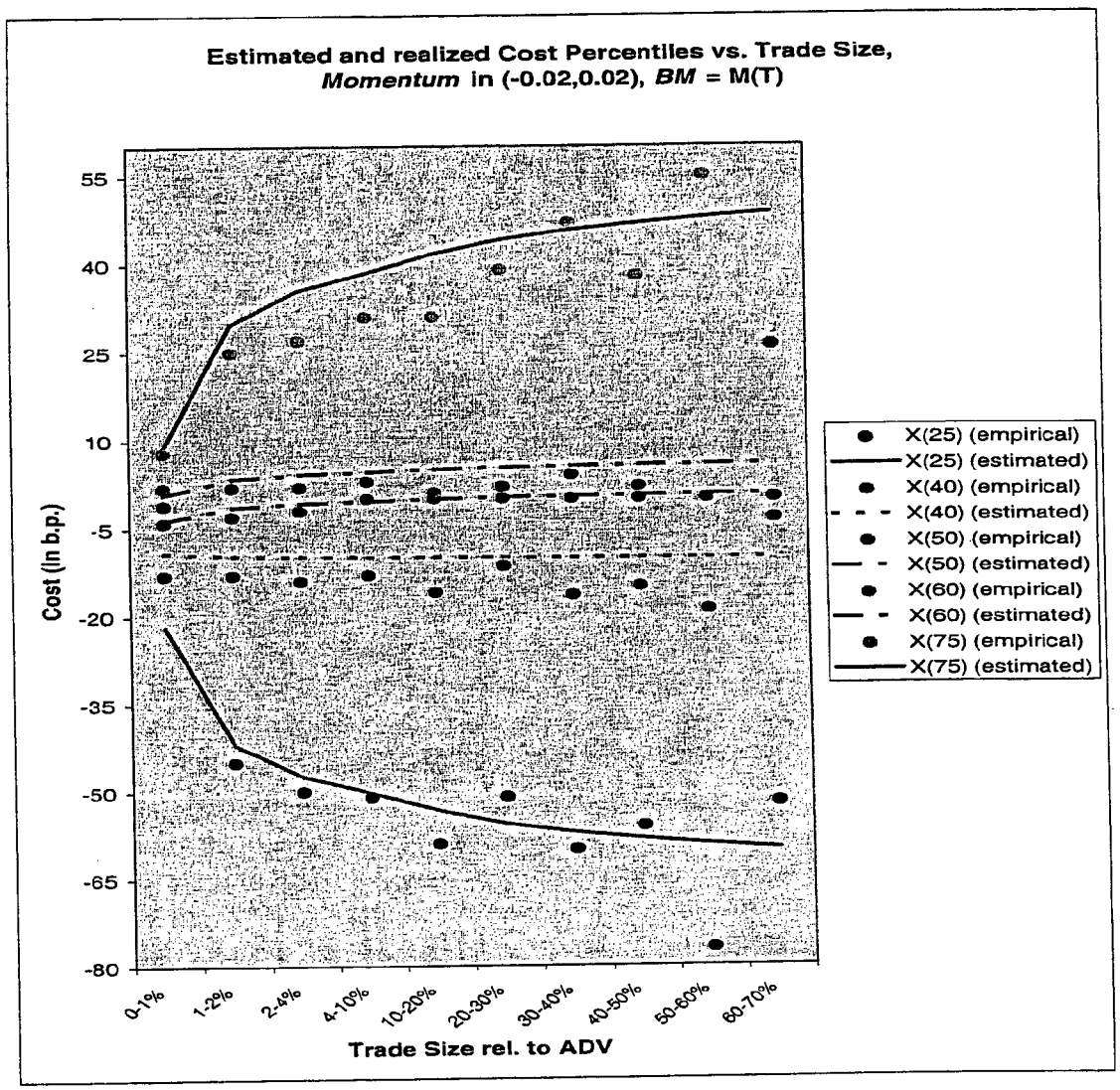

FIGS. 8-10 illustrate typical plots for estimated and realized cost percentiles versus trade sizes for the benchmarks $C_{T+20}$, $V_T$ and $M_T$. FIG. 8 shows estimated and realized cost percentiles versus trade sizes. The estimates are based on all executions that had momentum values within the rage (−0.02, 0.02). All estimates have been derived using regression technique WLS1. f and g have been selected as f(x)=x and g(x)=x. Costs are measured relative to benchmark $C_{T+20}$.

FIG. 9 displays estimated and realized cost percentiles versus trade sizes. The estimates are based on all executions of Large cap stocks that had momentum values within the range (−0.02, 0.02). All estimates have been derived using regression technique WLS1. f and g have been selected as f(x)=x and g(x)=x. Costs are measured relative to benchmark $V_T$.

FIG. 10 shows estimated and realized cost percentiles versus trade sizes. The estimates are based on all executions that had momentum values within the range (−0.02, 0.02). All estimates have been derived using regression technique WLS1. f and g have been selected according to Eq. 7. Costs are measured relative to benchmark $M_T$. In FIGS. 8 and 10, the estimates are based on all executions with Momentum values within the range (−0.02,0.02).

FIG. 9 contains cost percentiles for all Large cap stocks and executions with Momentum values within the range (−0.02, 0.02). As discussed above, the Figures show different behavior of cost percentiles for various benchmarks. Note that the scale on the y-axis varies considerably from benchmark to benchmark. Peer cost distributions for benchmark $C_{T+20}$ are generally flat and heavy-tailed, and the form of the distribution does not change drastically as the trade size increases. This is different for the benchmarks $V_T$ and $M_T$. In both cases, the standard deviations of peer cost distributions change considerably as trade sizes increase (for $M_T$ it increases, for $V_T$ it decreases).

Figure 11:
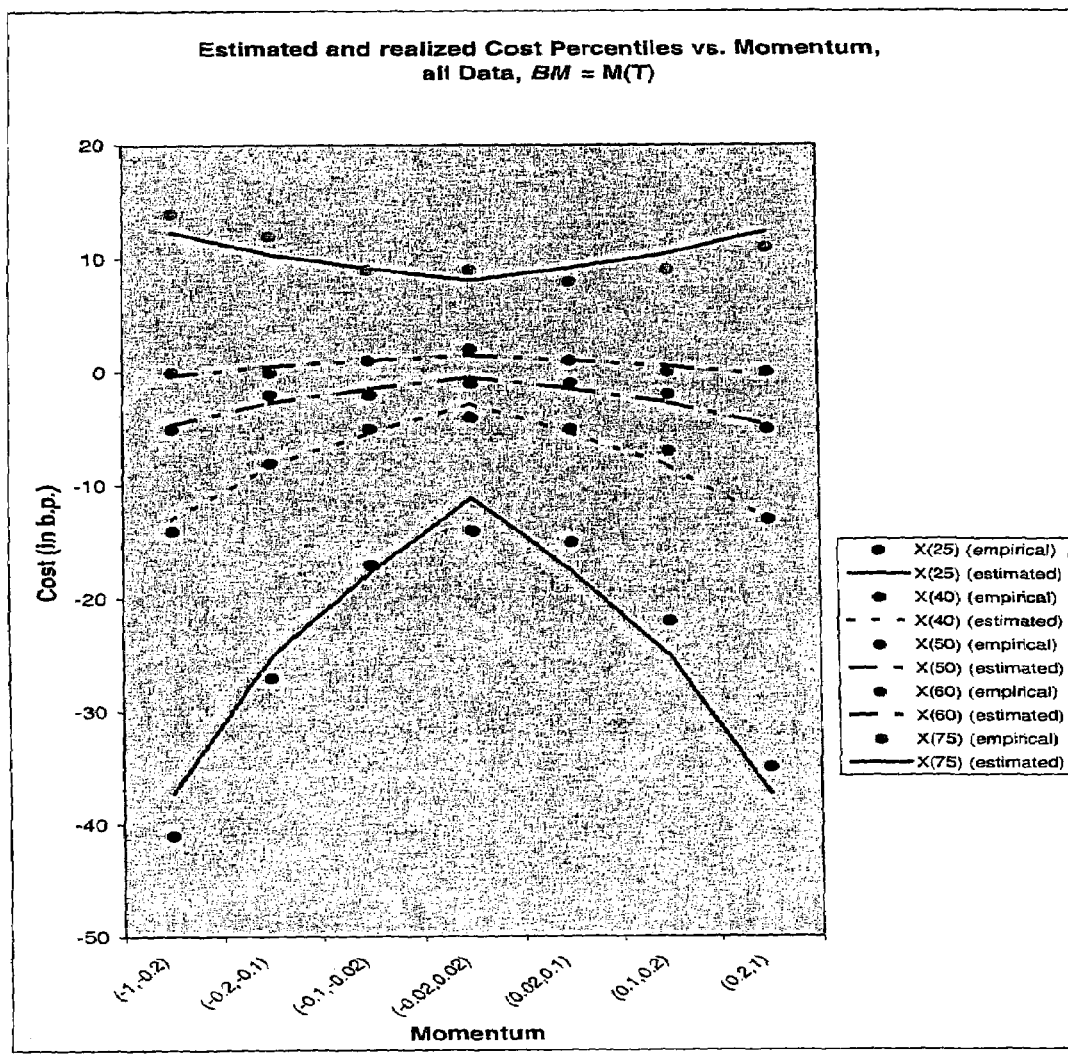
FIG. 11 is a graph showing estimated realized cost percentile versus momentum factor.

FIG. 11 displays estimated and realized cost percentiles versus momentum for the benchmark $M_T$. FIG. 11 illustrates that the cost percentiles depend on the variable Momentum non-linear fashion. Executions with high absolute values for short-term momentum appear to be more costly. The estimates are based on all executions. All estimates have been derived using regression technique WLS1. f and g have been selected as f(x)=x and g(x)=$|x|^{3/4}$.

Modeling the Tails of Peer Cost Distributions

It is well-known that empirical cost distributions are generally asymmetric and heavy-tailed. The asymmetry has been incorporated in the two-step methodology of the present invention by using five independent regression equations for the estimation of the 25th-, 40th-, 50th-, 60th- and 75th-percentiles. The heavy tails of the peer cost distributions can be modeled by Pareto distributions that are commonly used in extreme value theory (see e.g. Embrechts, Klueppelberg and Mikosch [6]). The modeling of the left tail of a peer cost distribution can be represented by the function F only. The methodology for the right tail can be modeled in a similar way.

Assuming a Pareto-type distribution tail behavior, the left tail of F is modeled as $$F(x) = c(X_{25} + z - x)^k, \text{ for } x \leq X_{25}, \quad \text{Eq. (9)}$$

where c, z and K, are positive constants determined from conditions:

(i) $0.25 = F(X_{25})$, (ii) $0.15(X_{40} - X_{25}) = F'(X_{25})$, and (iii) $0.0001 = F(-10,000)$.

Condition (i) follows directly from the definition of $X_{25}$ and Eq. (9), condition (ii) guarantees that the peer cost distribution function F is smooth in $X_{25}$, and condition (iii) assumes that all peer cost distributions must have virtually finite ranges. Selection of the function (9) does not assume that the function can be equal to 0, but the condition (iii) makes costs below −10,000 basis points practically impossible.

Conditions (i), (ii) and (iii) define the left tail of the distribution function F uniquely and percentiles $X_1, \ldots, X_{24}$ can be derived.

Since actual transaction costs are extremely noisy and heavy-tailed, a robust method to build peer group cost distributions is required. The present invention provides a methodology that estimates peer cost percentiles for six different benchmarks, two different clusterization types and all possible choices of scenarios. In the present invention, trading costs can be grouped by the factors Type, Market Capitalization, Side, Market, Size and Short-term Momentum. While the first four factors have discrete values as input, it may be assumed that the factors Size and Momentum can have any values between $[0,\infty)$ and $[-1,1]$, respectively.

The two-step approach provides smooth and robust estimates for all scenarios corresponding to any values of numerical factors Size and Momentum. If Size and Momentum are subdivided into discrete groups $S_1, \ldots, S_m$ and $M_1, \ldots, M_n$; $m, n \geq 1$, respectively, the procedure for estimating peer cost distributions remains similar to the continuous case. For any partition $(S_j, M_k)$ $1 \leq j \leq m$ and $1 \leq k \leq m$, compute average Size and Momentum (S, M) for the partition and determine the five percentiles $X_{25}, \ldots, X_{75}$ by inserting (S, M) in Eq. (4). All other percentile computations are identical to the continuous case.

The present invention filters out outliers in a natural way. Moreover, in contrast to a simple OLS regression, the two-step approach yields percentile estimates for the whole peer cost distribution. There is no theoretical justification on how to subdivide Momentum and Size groups in the first step of our methodology optimally. Regressing percentiles on the average Size and Momentum is an approximation only.

To measure performance of the two-step approach for an arbitrary scenario $\underline{y}=(y_1, y_2, y_3, y_4, y_5)$ for Market Capitalization, Side, Market, Size and Momentum one can compare the theoretical distributions with the corresponding empirical peer cost distributions (for $y_4$ and $y_5$ one can choose intervals $[y_4-\Delta y_4, y_4+\Delta y_4]$ and $[y_5-\Delta y_5, y_5+\Delta y_5]$). Comparing the theoretical with the empirical distributions provides an idea on how well the methodology works. Empirical studies performed by the present inventors have shown that in most cases estimated peer cost distributions are very close to the actual distributions. Percentile estimates of scenarios with very flat distributions appear to be less reliable. In particular, peer cost estimates for benchmark $C_{T+20}$ might differ significantly from the empirical peer cost characteristics.

FIGS. 12-15 illustrate four examples of theoretical and empirical cumulative peer cost distributions for different scenarios and benchmarks. The scenarios are abbreviated by X_Y_Z, where the character X stands for the corresponding category Market Capitalization, Y stands for the category Side and Z represents the category Market, assuming codes presented in FIG. 1. The solid black line denotes the empirical cumulative distribution function in each figure. All estimated cumulative distribution functions have been derived using the two-step approach with WLS1. The functions f and g in (Eg. 4) have been selected as indicated in above. The selected Size and Momentum values are specified by two intervals. Estimated cost percentiles have been built using the point in the center of each of these intervals.

Figure 12:
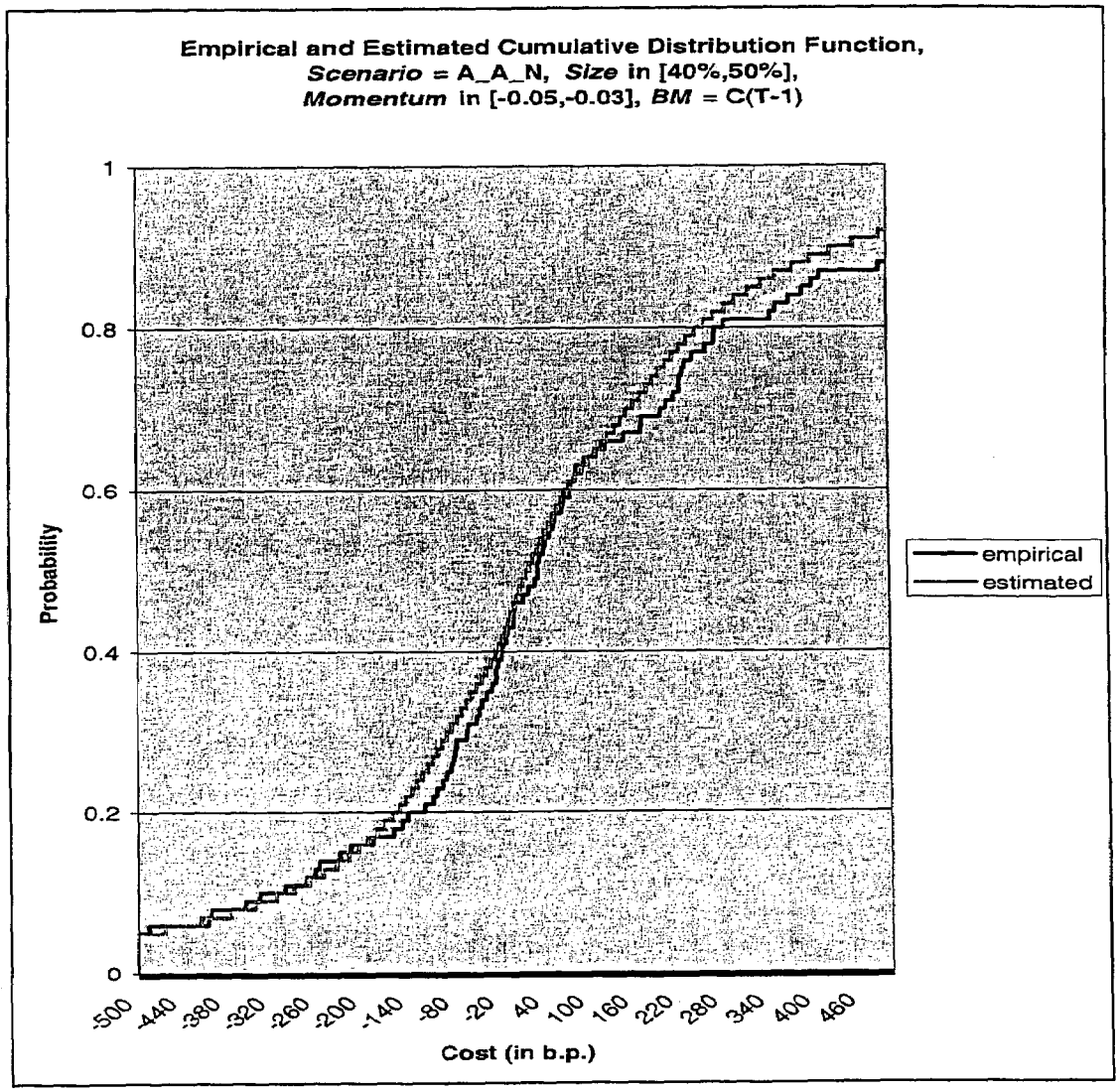
FIGS. 12-14 are graphs which compare the estimated cumulative distribution function versus its empirical counterpart.

FIG. 12 compares the estimated cumulative distribution function with the empirical counterpart. The distributions have been built using all executions that belong to Listed stocks (scenario A_A_N), have 40-50% ADV trade sizes and values for short-term momentum between −0.05 and −0.03. Cost have been measured relative to $C_{T-1}$. The estimated percentiles have been derived using the two-step approach with WLS1. The functions f and g in Eq. (4) have been chosen as. $f(x)=x$ and $g(x)=x$. The distributions have been determined using all executions that belong to Listed stocks, have 40-50% of ADV trade sizes and values for short-term momentum between −0.05 and −0.03. The figure shows that the distributions are concentrated around the median. Some discrepancies can be observed around the 25th- and 75th-percentiles. The discrepancies might have appeared because the constraints in Eq. (4) haven't been satisfied and thus the parameters $(\alpha_{25}, \beta_{25}, \gamma_{25})$ and $(\alpha_{75}, \beta_{75}, \gamma_{75})$ had to be adjusted. Another, simpler explanation might be that the scenario has a restricted number of empirical observations only. As a consequence, the empirical cumulative distribution might be not robust enough for comparison.

Figure 13:
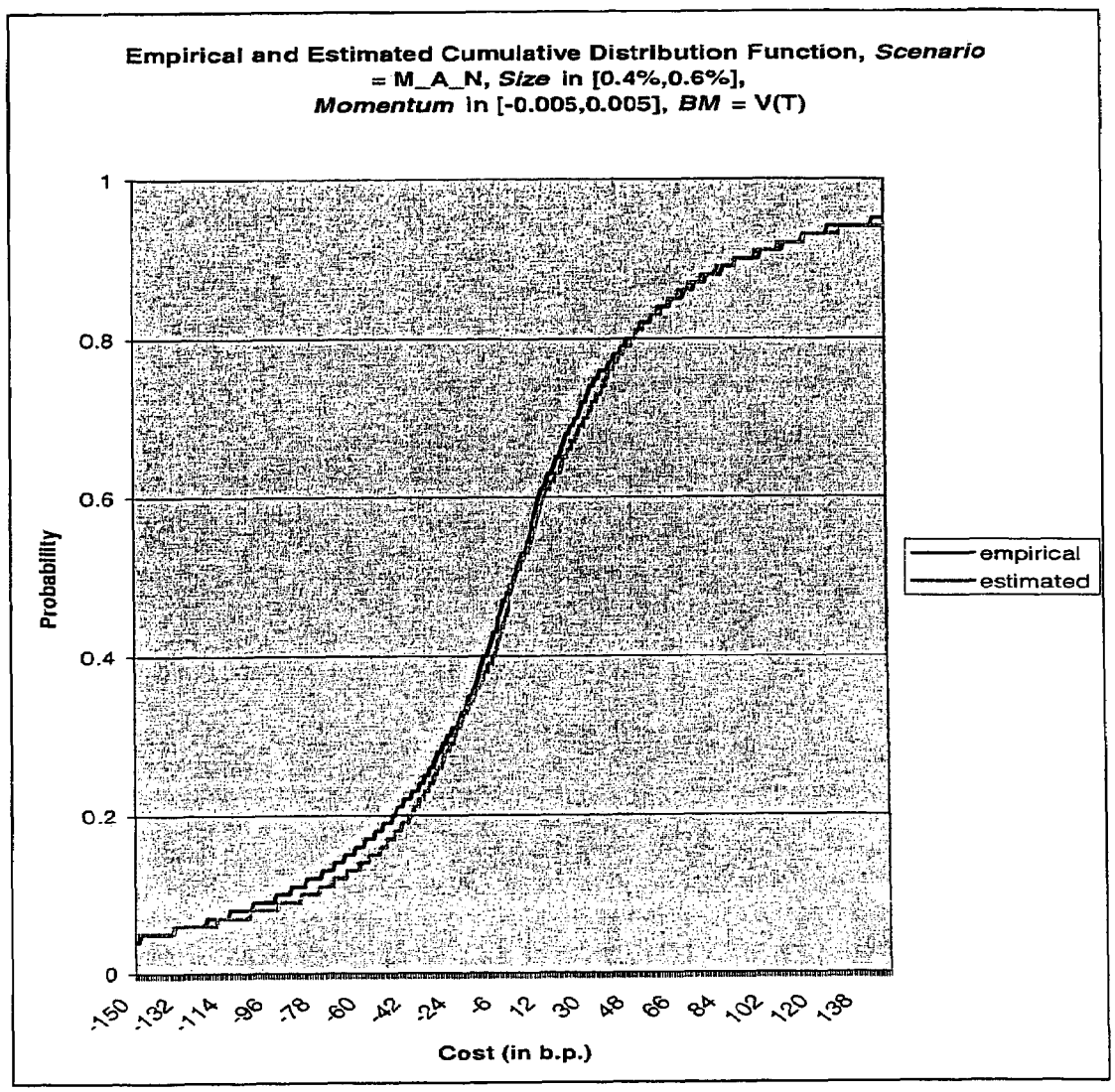
Figure 14:
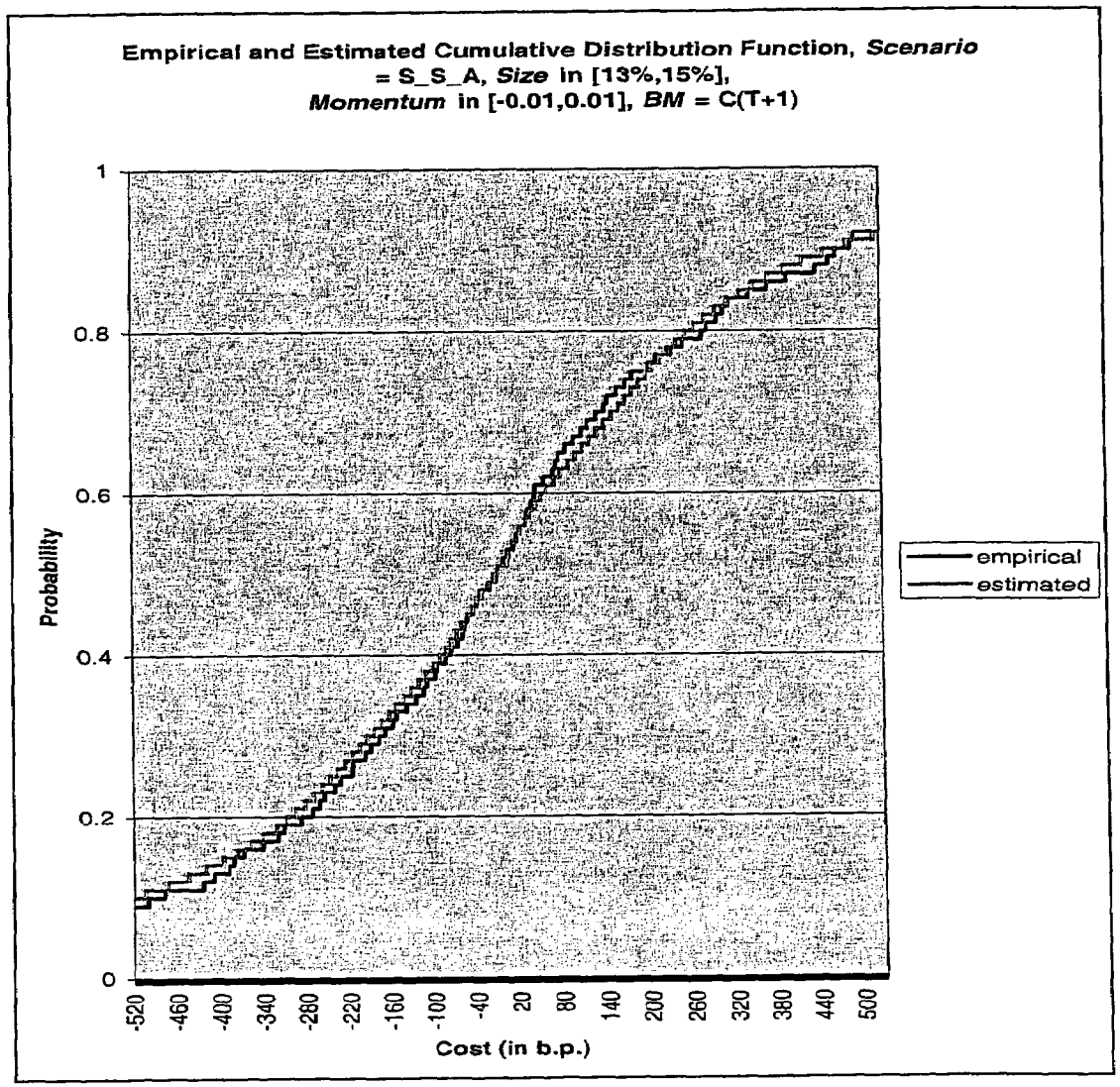
Figure 15:
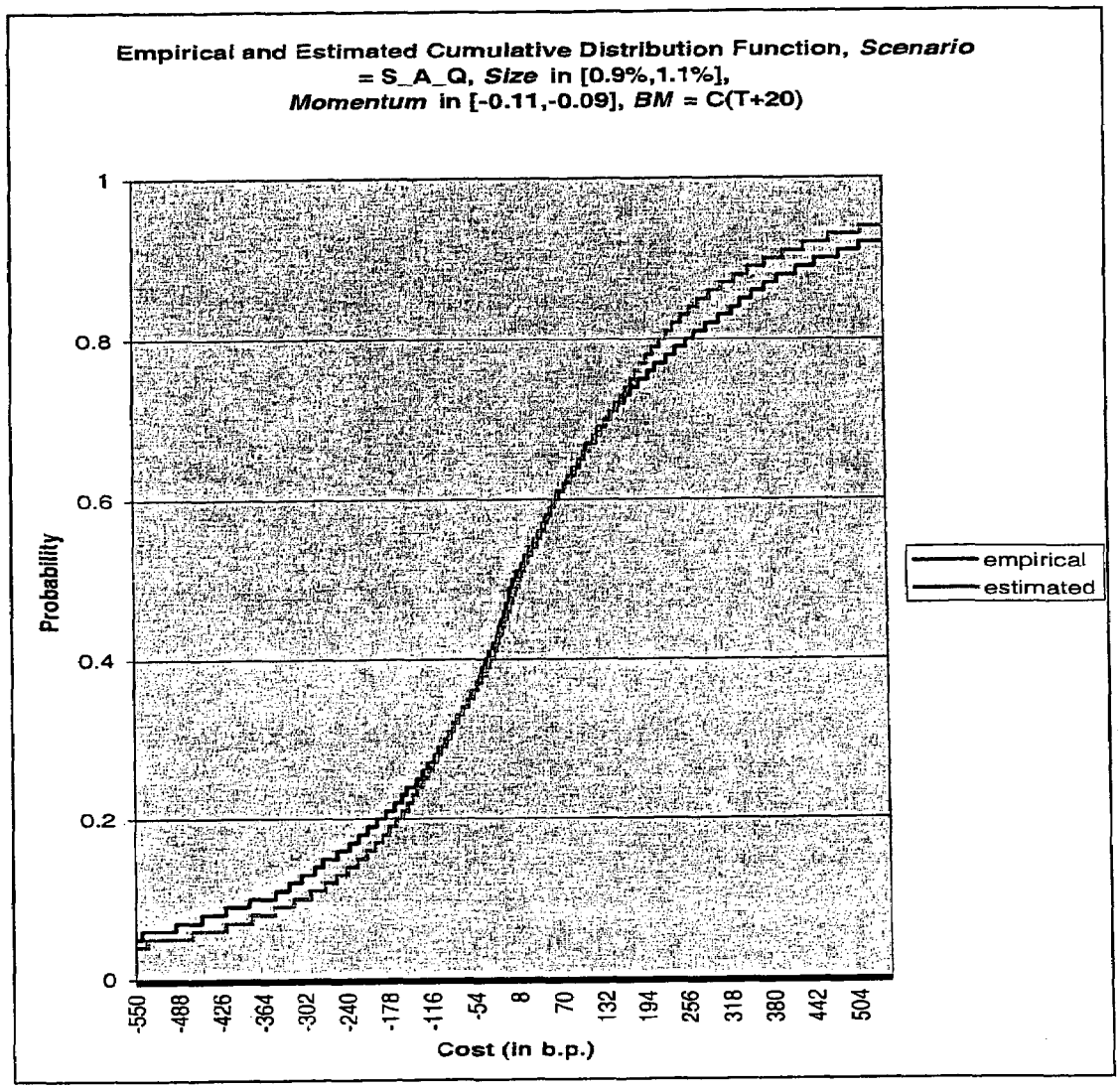
FIG. 15 is a graph comparing the estimated cumulative distribution function with its empirical counterpart.

FIG. 13 presents the comparison for all executions that belong to Mid cap, Listed stocks with trade sizes between 0.4% and 0.6% of ADV and short-term momentum values around 0. Note that this is a scenario to which a lot of observations belong. Therefore, it can be expected that the empirical cumulative distribution function is robust. The plot shows that both cumulative distribution functions almost coincide. A similar good performance can be observed in FIG. 13. In this figure, both distributions have been created using benchmark $C_{T+1}$ and scenario S_S_N with $y_4=0.14$ and $y_5=0$, i.e. sell trades belonging to Small cap stocks with trade sizes around 14% of ADV and short-term momentum around 0. FIG. 15 illustrates the comparison for benchmark $C_{T+20}$ and scenario S_A_Q with trade sizes around 1% of ADV and momentum values around −0.1. The chart demonstrates again an extraordinarily fit for percentiles between the 25th- and 75th-percentile range. However, in contrast to the other figures, the empirical and estimated cumulative distribution functions do not coincide in the tails. A possible reason might be that the assumptions made for the tail behavior, discussed above, are not always applicable for benchmark $C_{T+20}$. In particular, costs below −10,000 and above 10,000 b.p., respectively, may regularly occur and thus the threshold value 0.0001 is, probably, too low.

The presented charts can be viewed as a representative sample to assess performance of the two-step approach. The methodology provides consistent cost percentile estimates for the selection of the benchmarks, clusterization types and scenarios. By construction, estimates of median are the most accurate while percentiles for tails are based on modeling assumptions and, therefore, can potentially differ from actual percentiles. One could suggest to estimate more percentiles in equation (4). However, increasing the number of percentiles that are estimated by a regression equation has a big drawback. The more regressions one adds to equation (4) the more adjustments and estimation errors can occur. We believe that the current method provide; the most accurate percentile estimates around the center of the distribution as well as good percentile estimates overall.

REFERENCES

The following documents were referenced above throughout the present disclosure by author and [number]. The entire contents of each of the following publications are incorporated herein by reference:

[1] Berkowitz, S., Logue, D. and Noser E. (1988) The total cost of transactions on the NYSE, Journal of Finance, 41, 97-112;

[2] Breen, W. J., Hodrick, L. S. and Korajczyk, R. A. (2002) Predicting equity liquidity, Management Science, INFORMS, 48, 470-483;

[3] Chakravarty, 5., Panchapagesan, V. and Wood R. A. (2002) Has decimalization hurt institutional investors? An investigation into trading costs and order routing practices of buy-side institutions, http://www.nber.org/~confer/2002/micro02/wood.pdf;

[4] Chan, L. K. C. and Lakonishok, J. (1995) The behavior of stock prices around institutional trades, Journal of Finance, 50, 1147-1174;

[5] Domowitz, I., Glen, J. and Madhavan, A. (2001) Global equity trading costs, http://www.itginc.com/research/whitepapers/domowitz/globaleqcost.pdf;

[6] Embrechts, P., Klueppelberg, C. and Mikosch, T. (1997) Modelling Extremal Events) for Insurance and Finance, Springer, Heidelberg;

[7] ITG Inc. (2003) ACETM-Agency Cost Estimator, ITG Financial Engineering;

[8] Keim, D. B. and Madhavan, A. (1996) The upstairs market for large-block transactions: analysis and measurement of price effects, Review of Financial Studies, 9, 1-36;

[9] Keim, D. B. and Madhavan, A. (1997) Transaction costs and investment style: an inter-exchange analysis of institutional equity trades, Journal of Financial Economics, 46,: ~65-292;

[10] Lert, P. (2001) Methods of measuring transaction costs, Investment Guides, Spring 2001, 44-48;

[11] Madhavan, A. (2002) VWAP strategies, Investment Guides, Spring 2002, 32-39;

[12] Perold, A. (1988) The implementation shortfall: paper versus reality, Journal of Portfolio Management, 14,4-9;

[13] Schwartz, R. A. and Steil, B. (2002) Controlling institutional trading costs: we have met the enemy and it is us, Journal of Portfolio Management, 28, 39-49;

[14] Teitelbaum, R. (2003) Know a fund's' cost? Look deeper, The New York Times Company, Feb. 9, 2003;

[15] "Transaction Costs—A Cutting-Edge Guide to Best Execution" (2001) Investment Guides, Spring 2001, edited by Brian R. Bruce, Institutional Investor Inc;

[16] "Transaction Performance—The Changing Face of Trading" (2002) Investment Guides, Spring 2002, edited by Brian R. Bruce, Institutional Investor Inc.; and

[17] Werner, I. M. (2000) NYSE execution costs, http://www.rufrice.edu/~jgsfss/Werner.pdf.

Figure 16:
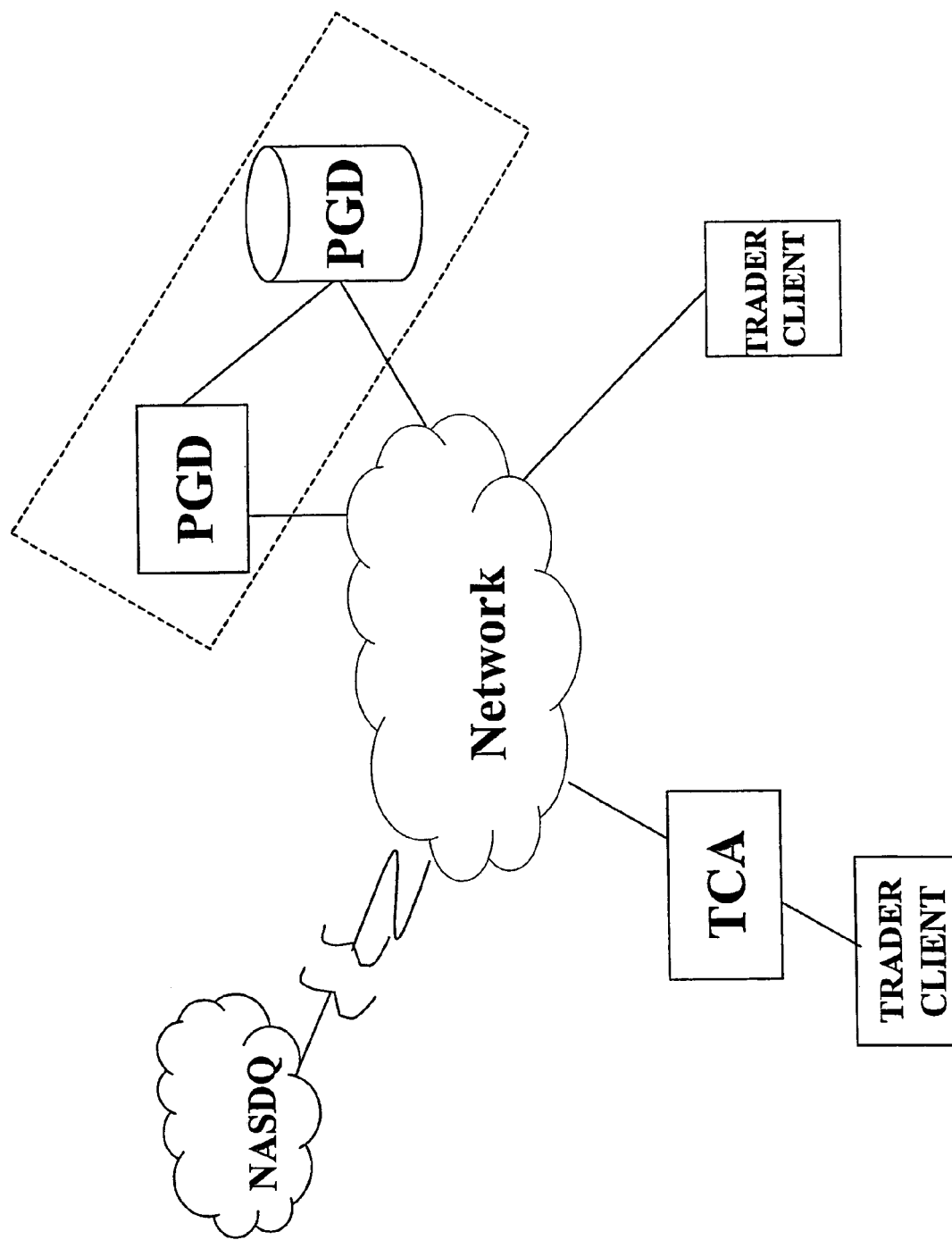
FIG. 16 is a block diagram of an exemplary system for estimating transaction costs according to an embodiment of the present invention.

One skilled in the art will understand that the above methodology may be implemented in any number of ways. For example, referring to FIG. 16, a system 100 for estimating transactions costs for peer institutions can include a processor unit 102 and a PGD database 104, coupled with a network 106, such as the Internet. Institutional traders use various client systems for performing securities transactions. For example, a client interface 108 may use a trader client 108 to trade on NASDAQ 200.

Tools can be used to collect trade data. For example, ITG markets a product called TCA™ (transaction cost analysis), which can collect and analyze transaction data. This tool may be used to collect transaction data and download the data to PGD database 104. As transactional data is collected, the benchmarks may be calculated in real-time as the data, or data can be collected later by batch processing. The data may be separated or organized according to cost factors, such as Size, Type, etc.

Periodically, such as once a month, or once a week, the two-step statistical analysis described above is performed on the transaction data to generate cost estimates for each institution for each scenario. First, data is grouped according to size and momentum and, second, each percentile (i) is regressed using linear interpolation, and other techniques described above. The data can be presented to a user in any number of ways.

Accordingly, processor unit 102 may be appropriately outfitted with software and hardware to perform the processes describe above, and configured to communicate with database 104 as necessary. One skilled in the art will understand that the system may be programmed using a number of conventional programming techniques and may be implemented in a number of configurations, including centralized or distributed architectures.

Figure 17:
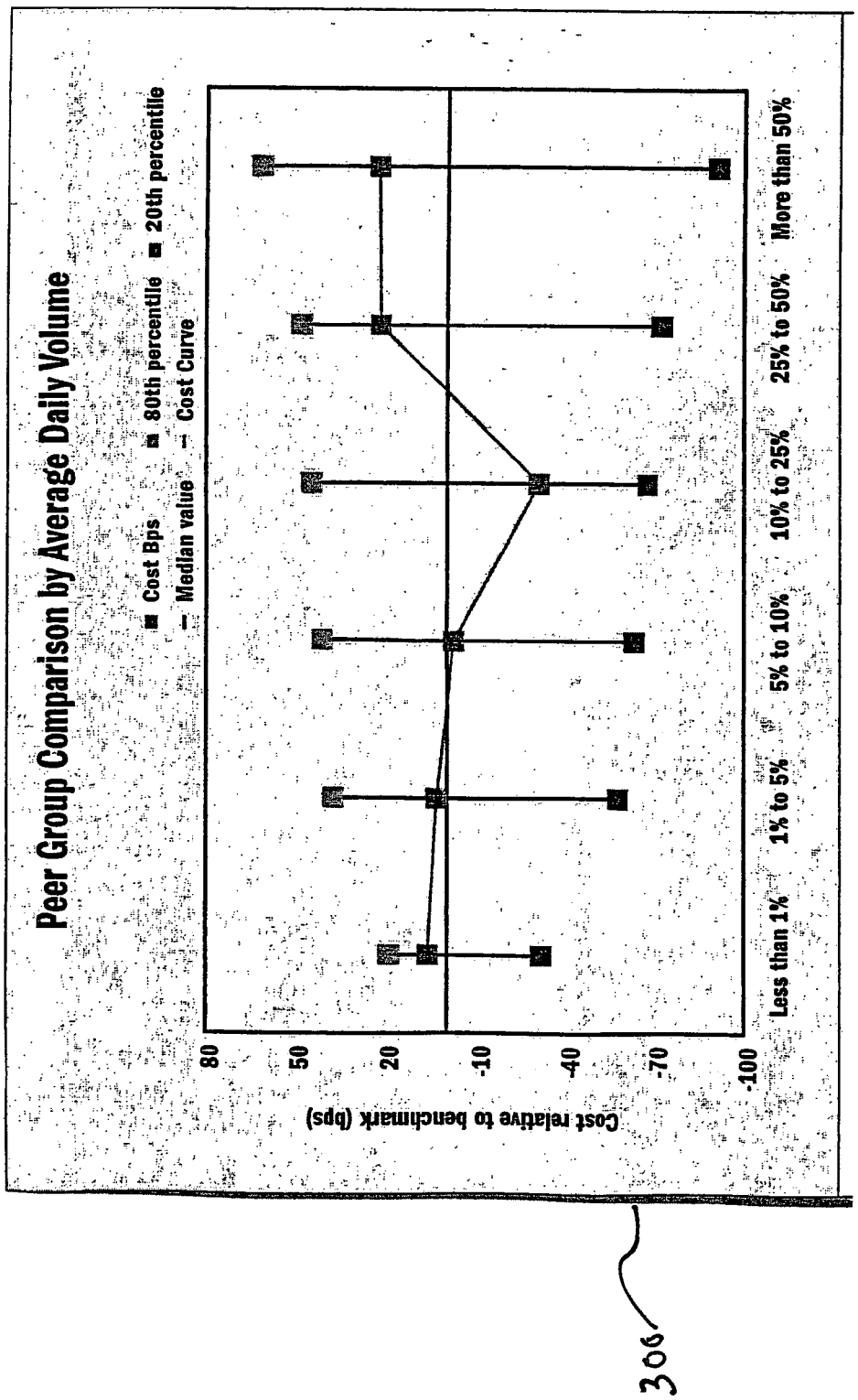
FIG. 17 is a screen shot of an exemplary page of an exemplary client interface.

Peer investment institutions may access the PGD via a client interface. An exemplary display is shown in FIG. 17. Display 300 shows a peer institutions performance for a particular benchmark relative to the entire cost distribution. The X axis is Size, by percentile, and the Y-axis is cost related to the benchmark, in basis points (bps). The cost distribution can be represent by bars, or any other graphical fashion, to show the peer institutions estimated costs with reference to then entire PGD. For example, graph 300 shows the current peers performance as being relatively good, relative to the entire PGD, for transaction sizes of less than 1%, 1% to 5%, 5% to 10%, 25% to 50% and for transaction sizes over 50%. This particular institution performs poorly for transaction sizes of 10% to 25%. This is merely an example of one way that meaningful results can be presented graphically, and one having ordinary skill in the art will readily recognize that once costs are estimated for a particular institution, for all benchmarks, groups and percentiles, there are many ways to present the results, either graphically or otherwise, in a meaningful fashion.

Thus, the present invention has been fully described with reference to the drawing figures. Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

We claim:

1. A computer-implemented method for creating a database, said method comprising:
   at one or more computers, collecting security transaction data for a preselected period of time, for a plurality of institutional investors, said transaction data including identity of securities being traded, transaction order sizes, execution prices and execution times;
   grouping said transaction data into groups of orders, wherein each group of orders consists of a plurality of orders each associated with a common category from a plurality of common categories;
   calculating a plurality of cost benchmarks for each group of orders;
   estimating transaction costs for each institutional investor from said transaction data relative to each of said calculated cost benchmarks for each category of said plurality of common categories; and
   storing said data for said calculated benchmarks and said estimated transaction costs;
   wherein the grouping of transaction data into groups of orders includes combining discrete transaction data which form an order into each order.

2. The method as recited in claim 1, wherein said estimating step includes a step of regressing said transaction costs onto a plurality of percentiles.

3. The method as recited in claim 2, wherein said regressing step utilizes a formula:

$$X_i = \alpha_i + \beta_i f(S) + \gamma_i g(M) + \epsilon_i,$$

for percentiles i=25, 40, 50, 60 or 75, and each percentile i is assumed to depend linearly on functions f and g of size (S) and momentum (M) respectively, and ($\alpha_i$, $\beta_i$, $\gamma_i$) are regression parameters.

4. The method as recited in claim 3, wherein the regression parameters ($\alpha_i$, $\beta_i$, $\gamma_i$) are estimated using (a) ordinary least squares (OLS), (b) weighted least squares (WLS) with respect to OLS residuals (WLS1), and (c) WLS with respect to observations in each subdivision (WLS2).

5. The method as recited in claim 3, wherein functions f and g are set to be linear functions.

6. The method as recited in claim 1, wherein said plurality of cost benchmarks include:
   a closing price $C_{T-1}$ of the security on a day prior to the day of the execution of the corresponding order;
   a volume-weighted average price VWAP across all trades for the security during the day of execution of the corresponding order;
   a closing price $C_{T+1}$ of the security on the first day after the day of execution of the corresponding order;
   a closing price $C_{T+20}$ of the security on the 20th day after the day of execution of the corresponding order;
   an open price $O_T$ of the security on the day of execution of the corresponding order; and
   a prevailing midquote $M_T$ of the security prior to the execution time of the corresponding order; and
   wherein each of said plurality of benchmarks are calculated for each security for each order.

7. The method recited in claim 1, wherein said plurality of common categories are associated with at least cost factors size and momentum.

8. The method recited in claim 6, wherein said plurality of common categories are associated with at least cost factors size and momentum.

9. The method as recited in claim 2, wherein said regressing step utilizes the formula:

$$X_i = \alpha_i + \beta_i f(S) + \gamma_i g(M) + \epsilon_i,$$

for percentiles i=25, 40, 50, 60 or 75, and each percentile i is assumed to depend linearly on functions f and g of size (S) and momentum (M) respectively, and ($\alpha_i$, $\beta_i$, $\gamma_i$) are regression parameters; and
   wherein transaction costs are regressed for each of at least one cost factor.

10. The method as recited in claim 9, wherein the regression parameters ($\alpha_i$, $\beta_i$, $\gamma_i$) are estimated using (a) ordinary least squares (OLS), (b) weighted least squares (WLS) with respect to OLS residuals (WLS1), and (c) WLS with respect to observations in each subdivision (WLS2).

11. The method as recited in claim 9, wherein functions f and g are set to be linear functions.

12. The method as recited in claim 1, wherein said cost benchmarks are calculated in real-time as transactions are executed, and are stored in a database.

13. The method as recited in claim 1, wherein said estimating step is performed periodically for all transactions that occurred during a predetermined time frame.

14. A computer-implemented method for ranking security transaction cost performance relative to transaction costs of other institutional investors, said method comprising steps of:
   at one or more computers, collecting security transaction data for a preselected period of time, for a plurality of investment institutions, said transaction data including identity of securities being traded, transaction order sizes, execution prices, momentum and execution times;
   grouping said transaction data into a plurality of orders, wherein each group of orders consists of a plurality of orders associated with a common category from a plurality of common categories;
   calculating a plurality of cost benchmarks for each group of orders;
   estimating transaction costs for each investment institution relative to each of said calculated cost benchmarks for each category of said plurality of common categories; and
   ranking a first investment institution of said plurality of institutional investors against said plurality of investment institutions based on said estimated transaction costs for said plurality of institutions for at least one of said common categories;
   wherein the grouping of transaction data into groups of orders includes combining discrete transaction data which form an order into each order.

15. The method as recited in claim 14, wherein said estimating step includes a step of regressing said transaction costs onto a plurality of percentiles.

16. The method as recited in claim 15, wherein said regressing step utilizes a formula:

$$X_i = \alpha_i + \beta_i f(S) + \gamma_i g(M) + \epsilon_i,$$

for percentiles i=25, 40, 50, 60 or 75, and each percentile i is assumed to depend linearly on functions f and g of size (S) and momentum (M) respectively, and ($\alpha_i$, $\beta_i$, $\gamma_i$) are regression parameters.

17. The method as recited in claim 16, wherein the regression parameters ($\alpha_i$, $\beta_i$, $\beta_i$) are estimated using (a) ordinary least squares (OLS), (b) weighted least squares (WLS) with respect to OLS residuals (WLS1), and (c) WLS with respect to observations in each subdivision (WLS2).

18. The method as recited in claim 16, wherein functions f and g are set to be linear functions.

19. The method as recited in claim 14, wherein said plurality of cost benchmarks include:
   a closing price $C_{T-1}$ of the security on a day prior to the day of the execution of the corresponding order;
   a volume-weighted average price VWAP across all trades for the security during the day of execution of the corresponding order;
   a closing price $C_{T+1}$ of the security on the first day after the day of execution of the corresponding order;
   a closing price $C_{T+20}$ of the security on the 20th day after the day of execution of the corresponding order;
   an open price $O_T$ of the security on the day of execution of the corresponding order; and
   a prevailing midquote $M_T$ of the security prior to the execution time of the corresponding order; and
   wherein each of said plurality of benchmarks are calculated for each security for each order.

20. The method recited in claim 14, wherein said plurality of common categories are associated with at least cost factors size and momentum.

21. The method recited in claim 19, wherein said plurality of common categories are associated with at least cost factors size and momentum.

22. The method as recited in claim 15, wherein said regressing step utilizes a formula:

$$X_i = \alpha_i + \beta_i f(S) + \gamma_i g(M) + \epsilon_i,$$

for percentiles i=25, 40, 50, 60 or 75, and each percentile i is assumed to depend linearly on functions f and g of size (S) and momentum (M) respectively, and ($\alpha_i$, $\beta_i$, $\gamma_i$) are regression parameters; and wherein transaction costs are regressed for each of at least one cost factor.

23. The method as recited in claim 22, wherein the regression parameters ($\alpha_i$, $\beta_i$, $\gamma_i$) are estimated using (a) ordinary least squares (OLS), (b) weighted least squares (WLS) with respect to OLS residuals (WLS1), and (c) WLS with respect to observations in each subdivision (WLS2).

24. The method as recited in claim 22, wherein functions f and g are set to be linear functions.

25. The method as recited in claim 14, wherein said cost benchmarks are calculated in real-time as transactions are executed, and are stored in a database.

26. The method as recited in claim 14, wherein said estimating step is performed periodically for all transactions that occurred during a predetermined time frame.

27. A system for ranking security transaction cost performance relative to transaction costs for a plurality of institutional investors, said system comprising:

processing means for collecting security transaction data for a preselected period of time, for a plurality of institutional investment investors, said transaction data including identity of securities being traded, transaction order sizes, execution prices, momentum and execution times, grouping said transaction data into groups of orders, wherein each group of orders consist of a plurality of orders associated with a common category from a plurality of common categories; calculating a plurality of cost benchmarks for each group of orders; estimating transaction costs for each institutional investor from said transaction data relative to each of said calculated cost benchmarks for each category of said plurality of common categories; and ranking a first investment institution of said plurality of investment institutions based on said estimated transaction cost against said plurality of investment institutions for at least one of said common categories; and storing means for receiving data from said processing means, storing said data, and making data available to said processing means;

wherein grouping of transaction data into groups of orders includes combination discrete transaction data which form an order into each order.

28. The system according to claim 27, wherein said processing means estimates the transaction costs by regressing said transaction costs onto a plurality of percentiles.

29. The system according to claim 28, wherein said processing means performs the regression by a formula:

$$X_i = \alpha_i + \beta_i f(S) + \gamma_i g(M) + \epsilon_i,$$

for percentiles i=25, 40, 50, 60 or 75, and each percentile i is assumed to depend linearly on functions f and g of size (S) and momentum (M) respectively, and ($\alpha_i$, $\beta_i$, $\gamma_i$) are regression parameters.

30. The system according to claim 29, wherein the regression parameters ($\alpha_i$, $\beta_i$, $\gamma_i$) are estimated using (a) ordinary least squares (OLS), (b) weighted least squares (WLS) with respect to OLS residuals (WLS1), and (c) WLS with respect to observations in each subdivision (WLS2).

31. The system according to claim 29, wherein functions f and g are set to be linear functions.

32. The system according to claim 27, wherein said plurality of cost benchmarks include:

a closing price $C_{T-1}$ of the security on a day prior to the day of the execution of the corresponding order;

a volume-weighted average price VWAP across all trades for the security during the day of execution of the corresponding order;

a closing price $C_{T+1}$ of the security on the first day after the day of execution of the corresponding order;

a closing price $C_{T+20}$ of the security on the 20th day after the day of execution of the corresponding order;

an open price $O_T$ of the security on the day of execution of the corresponding order; and a prevailing midquote $M_T$ of the security prior to the execution time of the corresponding order; and wherein each of said plurality of benchmarks are calculated for each security for each order.

33. The system according to claim 27, wherein said plurality of common categories are associated with at least cost factors size and momentum.

34. The system according to claim 32, wherein said plurality of common categories are associated with at least cost factors size and momentum.

35. The system according to claim 28, wherein said processing means performs the regression by a formula:

$$X_i = \alpha_i + \beta_i f(S) + \gamma_i g(M) + \epsilon_i,$$

for percentiles i=25, 40, 50, 60 or 75, and each percentile i is assumed to depend linearly on functions f and g of size (S) and momentum (M) respectively, and ($\alpha_i$, $\beta_i$, $\gamma_i$) are regression parameters; and wherein transaction costs are regressed for each of at least one cost factor.

36. The system according to claim 35, wherein the regression parameters ($\alpha_i$, $\beta_i$, $\gamma_i$) are estimated using (a) ordinary least squares (OLS), (b) weighted least squares (WLS) with respect to OLS residuals (WLS1), and (c) WLS with respect to observations in each subdivision (WLS2).

37. The system according to claim 35, wherein functions f and g are set to be linear functions.

38. The system according to claim 27, wherein said cost benchmarks are calculated in real-time as transactions are executed, and are stored in a database.

39. The system according to claim 27, wherein said processing means performs periodically for all transactions that occurred during a predetermined time frame.

40. A system for ranking security transaction cost performance relative to transaction costs for a plurality of institutional investors, said system comprising:

a processing unit coupled with a network and configured to collect security transaction data for a pre-selected period of time, for a plurality of investment institutional investors, said transaction data including identity of securities being traded, transaction order sizes, execution prices, momentum and execution times, to group said transaction data into groups of orders, wherein each group of orders consists of a plurality of orders associated with a common category from a plurality of common categories, to calculate a plurality of cost benchmarks for each group of orders, to estimate transaction costs for each order from said transaction data relative to each of said calculated cost benchmarks for each category of said plurality of common categories, and to store said data for said calculated benchmarks and said estimated transaction costs in a database; and a database unit coupled with said processing unit and configured to communicate with said processing unit, store data, and make data available to said processing unit;

wherein grouping transaction data into groups of orders includes combining discrete transaction data which form an order into each order.

41. The system according to claim 40, wherein said processing unit is further configured to estimate the transaction costs by regressing said transaction costs onto a plurality of percentiles.

42. The system according to claim 41, wherein said processing unit is further configured to perform the regression by a formula:

$$X_i = \alpha_i + \beta_i f(S) + \gamma_i g(M) + \epsilon_i,$$

for percentiles i=25, 40, 50, 60 or 75, and each percentile i is assumed to depend linearly on functions f and g of size (S) and momentum (M) respectively, and ($\alpha_i$, $\beta_i$, $\gamma_i$) are regression parameters.

43. The system according to claim 42, wherein the regression parameters ($\alpha_i$, $\beta_i$, $\gamma_i$) are estimated using (a) ordinary least squares (OLS), (b) weighted least squares (WLS) with respect to OLS residuals (WLS1), and (c) WLS with respect to observations in each subdivision (WLS2).

44. The system according to claim 43, wherein functions f and g are set to be linear functions.

45. The system according to claim 44, wherein said plurality of cost benchmarks include:
 a closing price $C_{T-1}$ of the security on a day prior to the day of the execution of the corresponding order;
 a volume-weighted average price VWAP across all trades for the security during the day of execution of the corresponding order;
 a closing price $C_{T+1}$ of the security on the first day after the day of execution of the corresponding order;
 a closing price $C_{T+20}$ of the security on the 20th day after the day of execution of the corresponding order;
 an open price $O_T$ of the security on the day of execution of the corresponding order; and
 a prevailing midquote $M_T$ of the security prior to the execution time of the corresponding order; and
 wherein each of said plurality of benchmarks are calculated for each security for each order.

46. The system according to claim 45, wherein said plurality of common categories are associated with at least one cost factors size and momentum.

47. The system according to claim 45, wherein said cost benchmarks are calculated in real-time as transactions are executed, and are stored in a database.

48. The system according to claim 45, wherein said processing unit performs estimates periodically for all transactions that occurred during a predetermined time frame.

49. The system according to claim 40, further comprising at least one client interface coupled with said database unit, said client interface configured to display a ranking for a selected institutional investor based on said data stored in said database unit.

50. The system according to claim 49, wherein said client interface is configured to graphically display said ranking as bar graphs, said ranking shown as a percentage of a total range for a plurality of factors.

51. The system according to claim 49, wherein said client interface is configured to graphically display said ranking as bar graphs, said ranking shown as a percentage of a total range for each said cost benchmark.

52. The method of claim 1 further comprising a step of preparing a graphical representation for display on a client interface said estimated transaction costs for a selected benchmark for a selected institutional investor for one or more selected common categories relative to one or more measures of central tendency or extrema of the estimated transaction costs of the plurality of institutional investors for said selected bench mark for said selected one or more common categories.

53. The method of claim 27 wherein the processing means further comprises processing means for preparing a graphical representation for a display on a client interface said estimated transaction costs for a selected benchmark for a selected institutional investor for one or more selected common categories relative to one or more measures of central tendency or extrema of the estimated transaction costs of the plurality of institutional investors for said selected bench mark for said selected one or more common categories.

54. The method of claim 40 wherein the processing unit is further configured to prepare a graphical representation for display on a client interface said estimated transaction costs for a selected benchmark for a selected institutional investor for one or more selected common categories relative to one or more measures of central tendency or extrema of the estimated transaction costs of the plurality of institutional investors for said selected bench mark for said selected one or more common categories.

* * * * *